(12) United States Patent
Stallings et al.

(10) Patent No.: US 8,331,992 B2
(45) Date of Patent: Dec. 11, 2012

(54) INTERACTIVE LOCKED STATE MOBILE COMMUNICATION DEVICE

(75) Inventors: Heath Stallings, Colleyville, TX (US); Sok Y. Hwang, Dallas, TX (US); Daniel Spurgeon Dunnam, Brooklyn, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 545 days.

(21) Appl. No.: 12/340,263

(22) Filed: Dec. 19, 2008

(65) Prior Publication Data

US 2010/0159995 A1    Jun. 24, 2010

(51) Int. Cl.
*H04M 1/00* (2006.01)
*H04M 1/725* (2006.01)
*H04B 1/38* (2006.01)

(52) U.S. Cl. .................................. 455/566; 455/412.2

(58) Field of Classification Search ............ 455/566, 455/412.2
See application file for complete search history.

(56) References Cited

U.S. PATENT DOCUMENTS

| 6,920,337 | B2 * | 7/2005 | Pinsky et al. | 455/556.1 |
| 7,205,959 | B2 * | 4/2007 | Henriksson | 345/4 |
| 2002/0078393 | A1 * | 6/2002 | Parker | 713/324 |
| 2003/0084109 | A1 * | 5/2003 | Balluff | 709/206 |
| 2008/0220752 | A1 * | 9/2008 | Forstall et al. | 455/415 |
| 2010/0146235 | A1 * | 6/2010 | Weber et al. | 711/165 |

* cited by examiner

*Primary Examiner* — Marisol Figueroa

(57) ABSTRACT

A mobile communication device receives current information while the mobile communication device is in one of a sleep state or a locked state, and associates one or more portions of the current information with one or more corresponding windows. The mobile communication device also displays, via a display associated with the mobile communication device, the one or more corresponding windows and the one or more associated portions of the current information while the mobile communication device is in the locked state. The mobile communication device further enables a user associated with the mobile communication device to manipulate the one or more displayed corresponding windows while the mobile communication device is in the locked state.

25 Claims, 17 Drawing Sheets

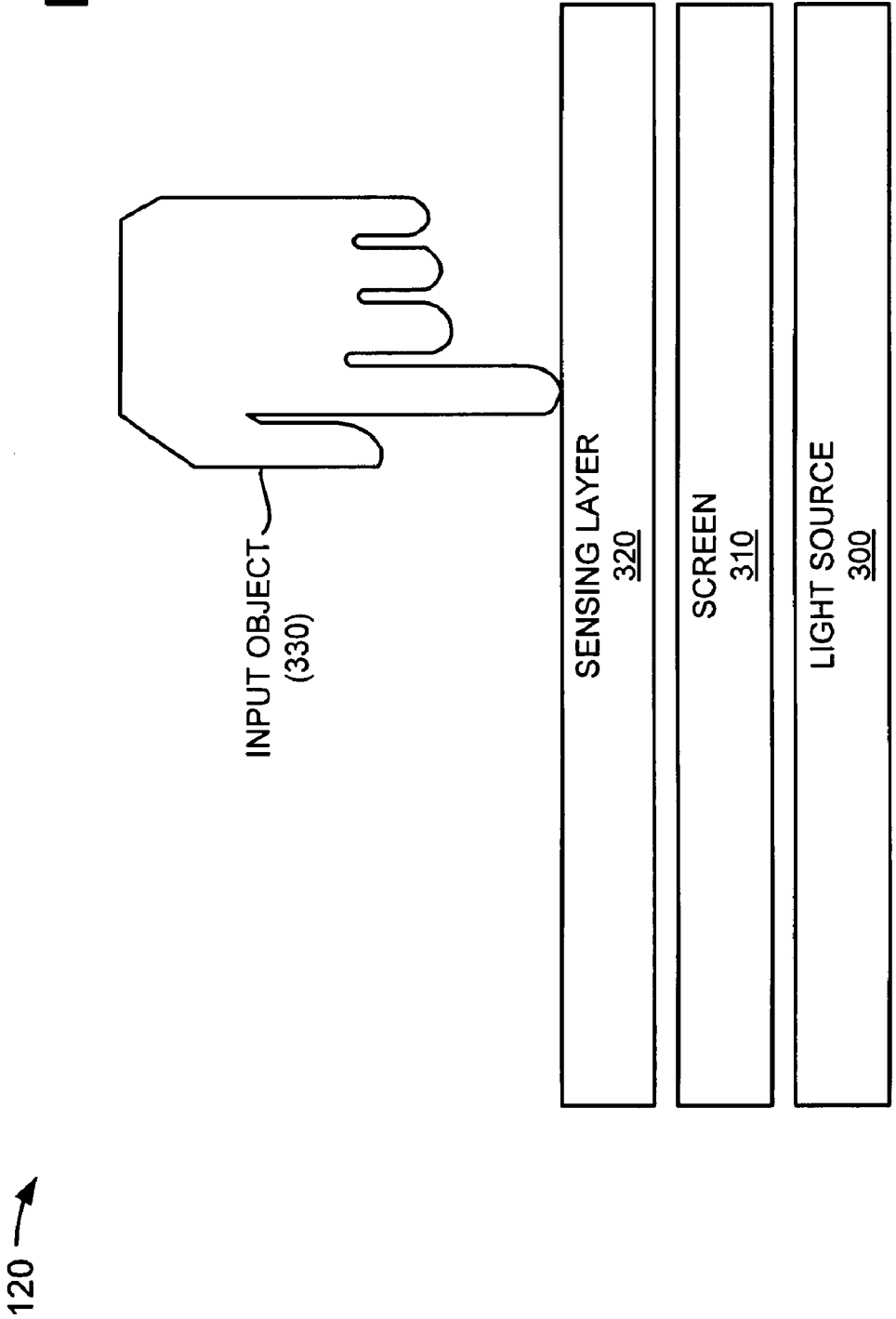

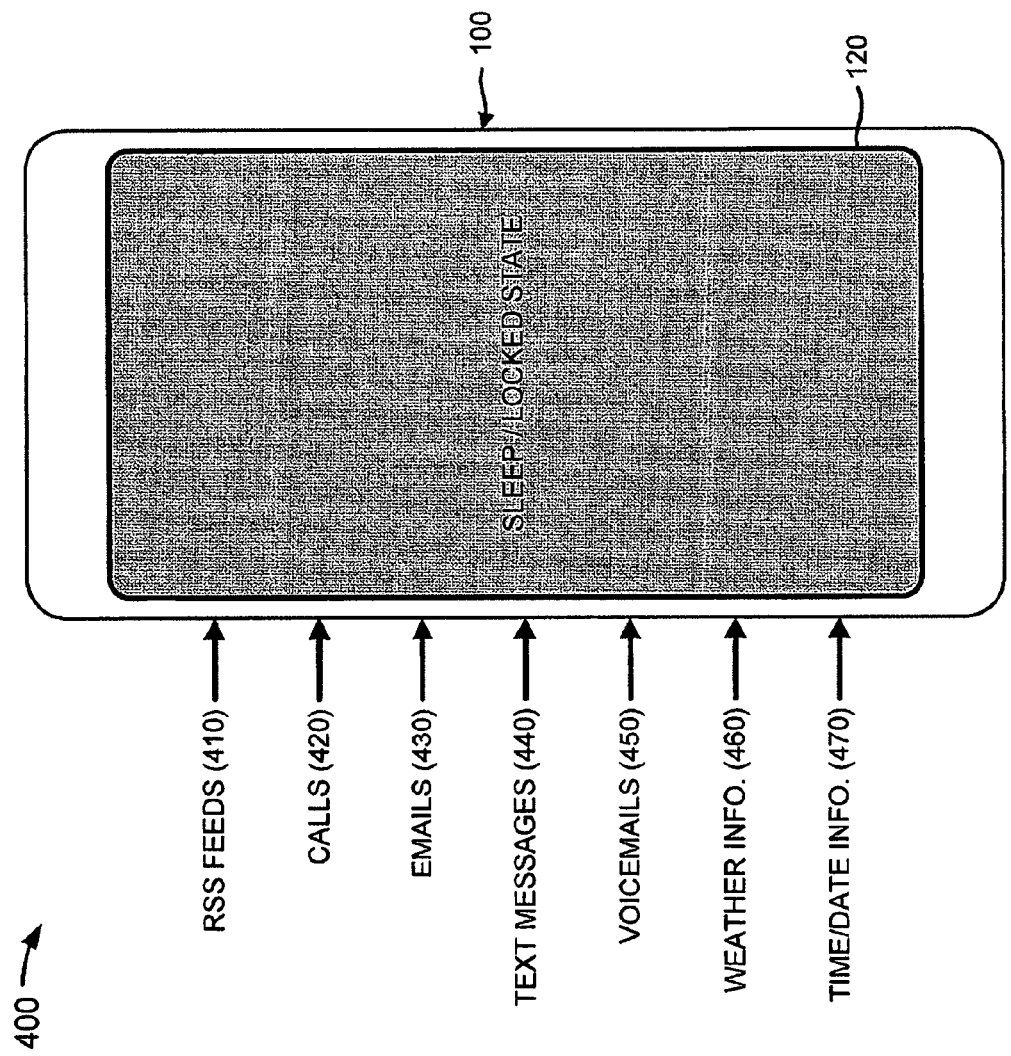

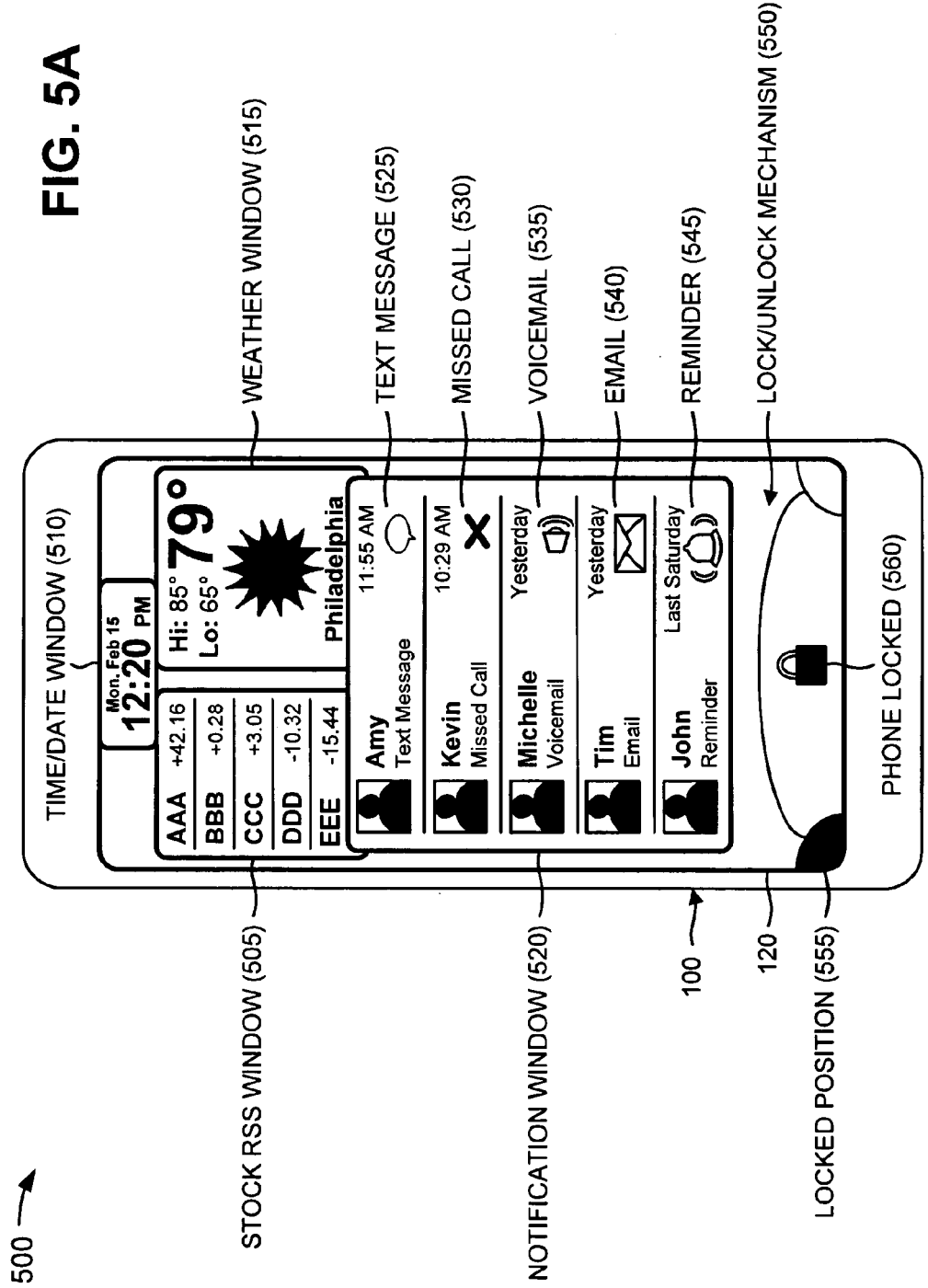

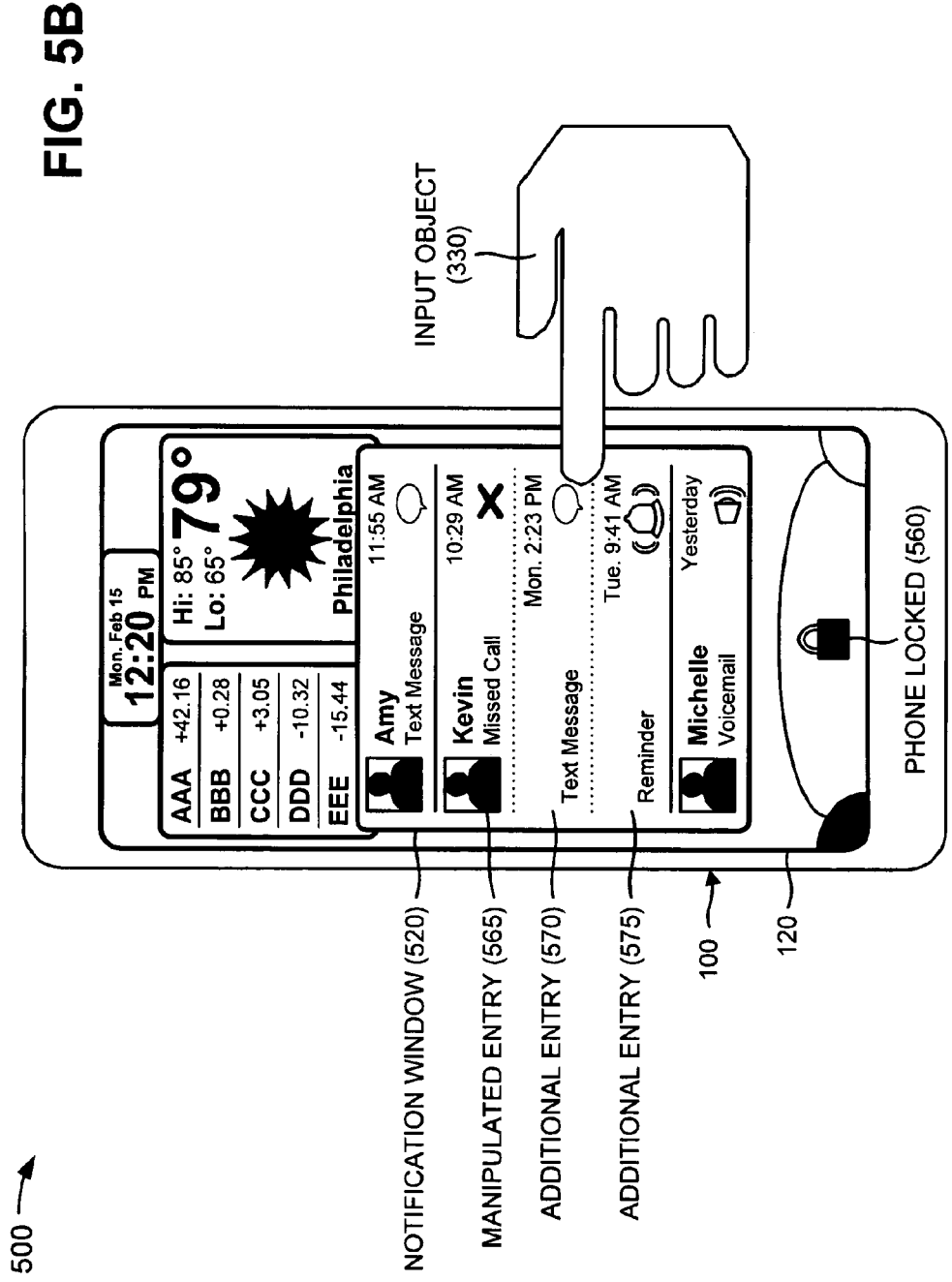

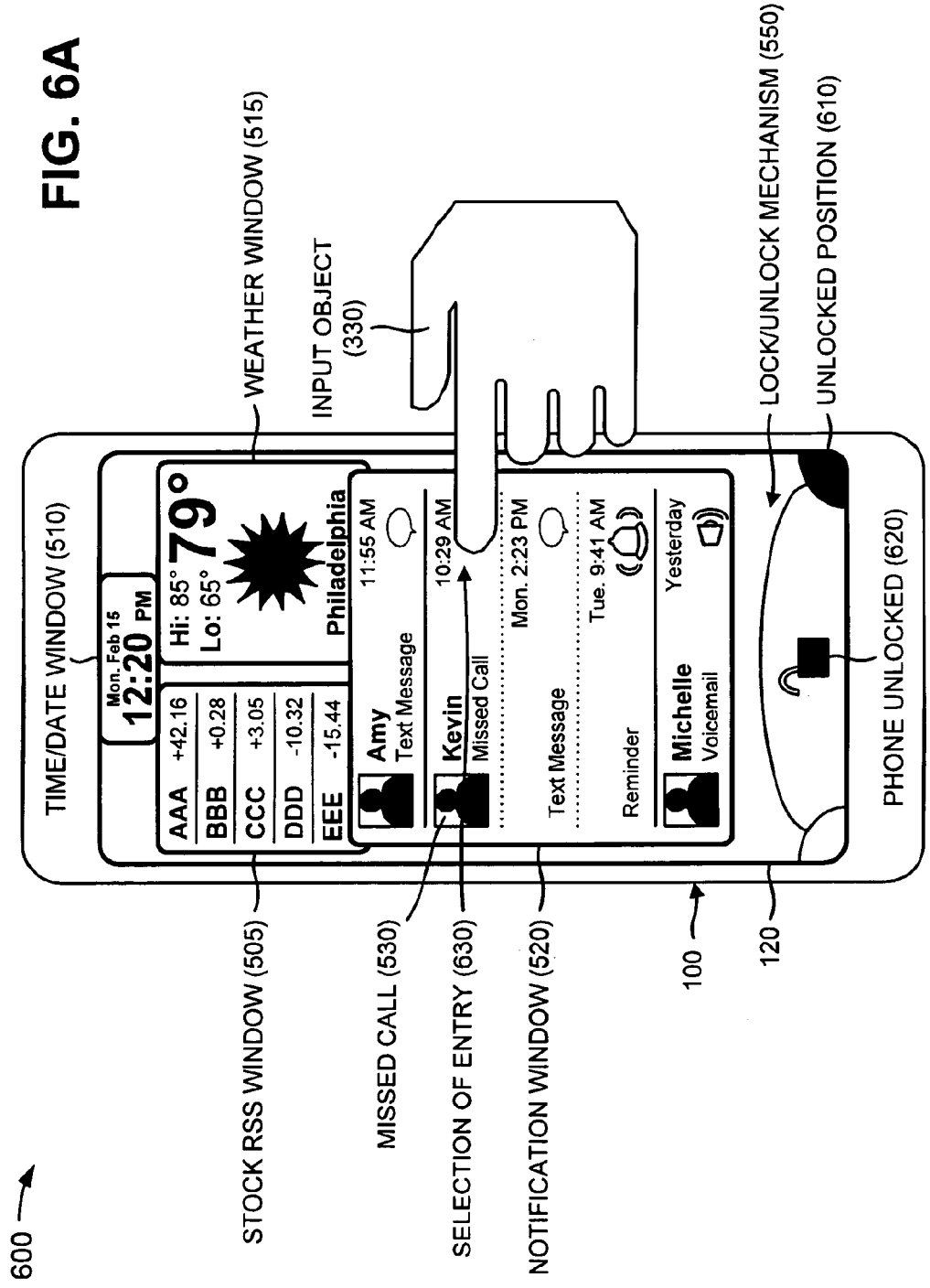

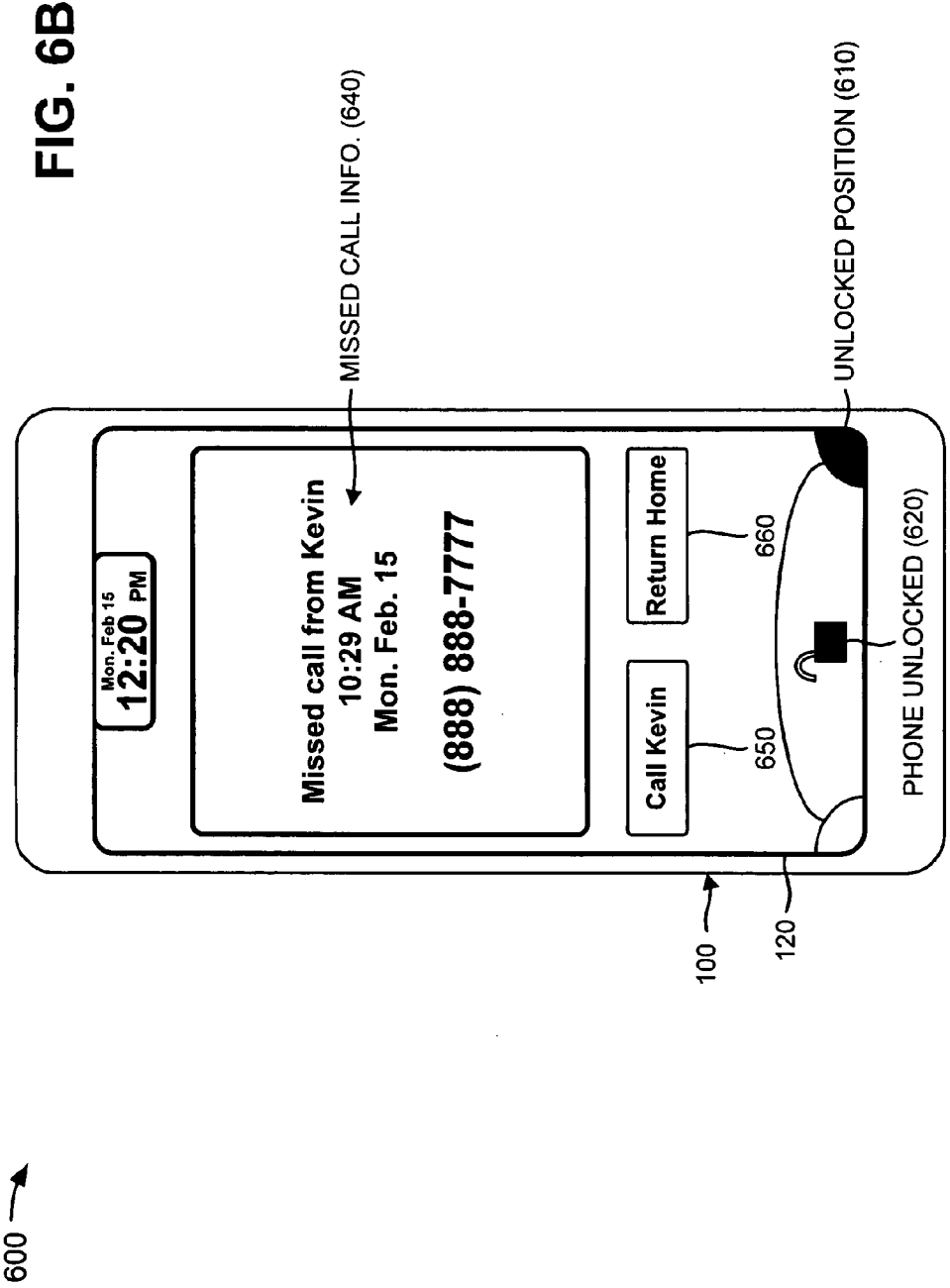

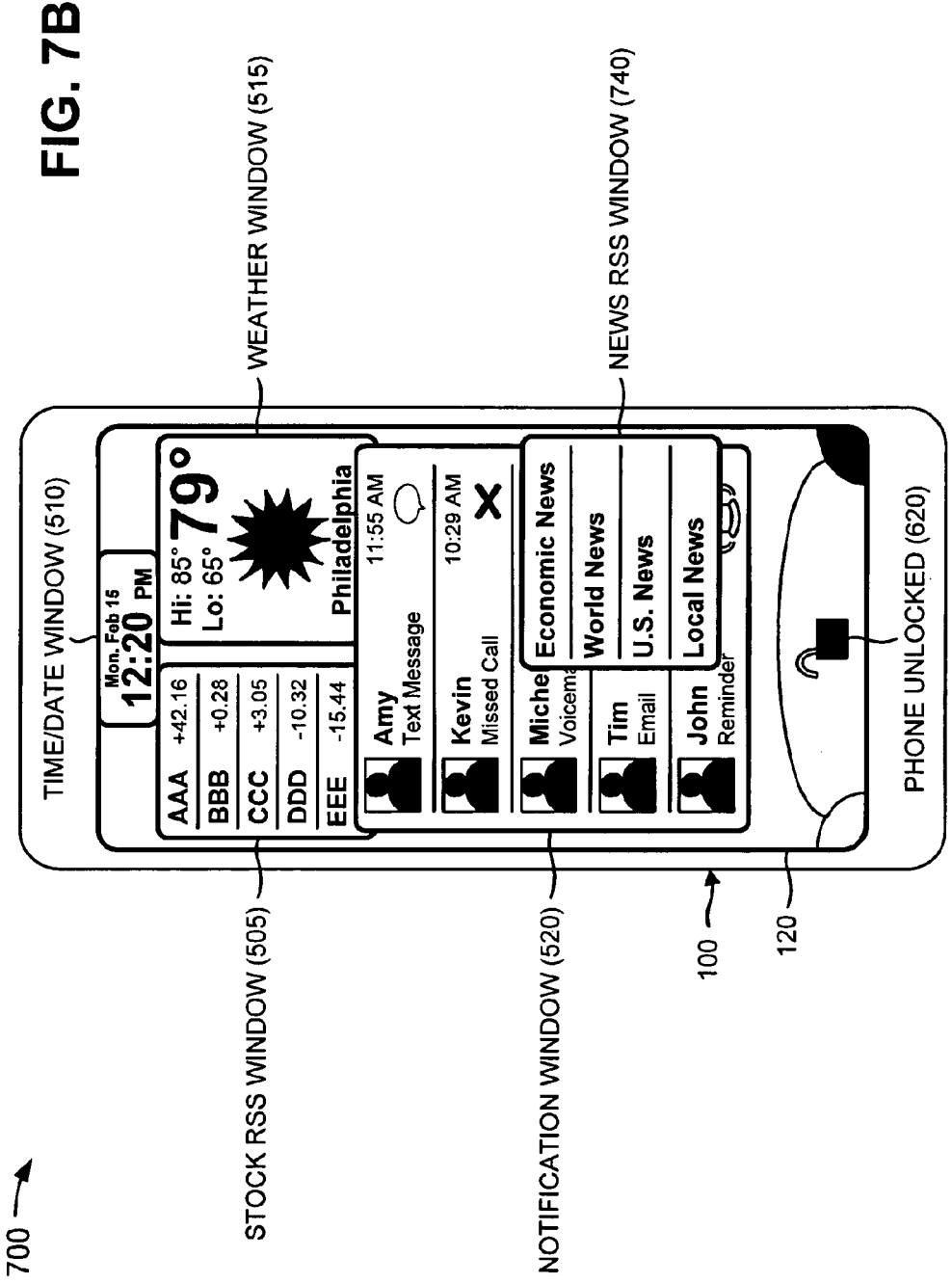

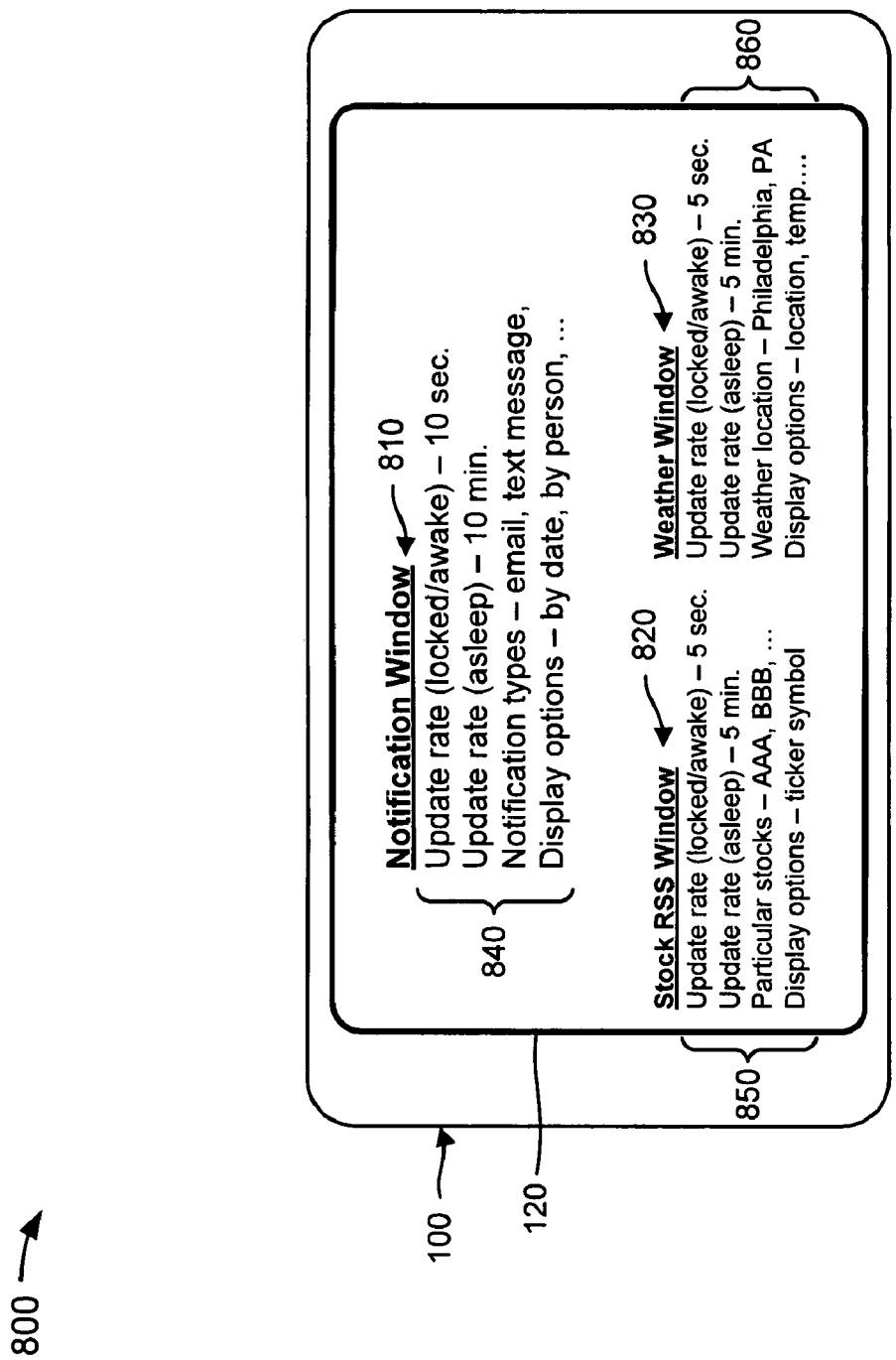

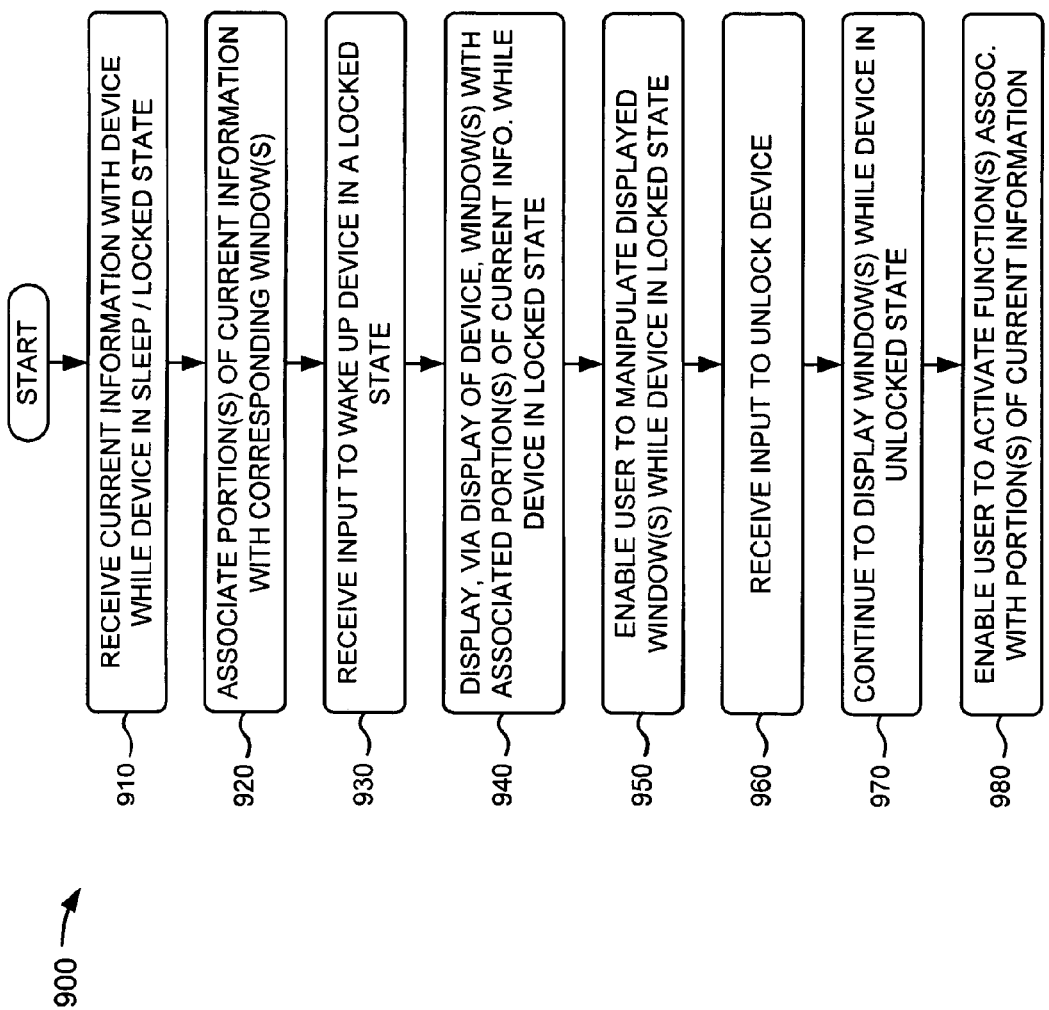

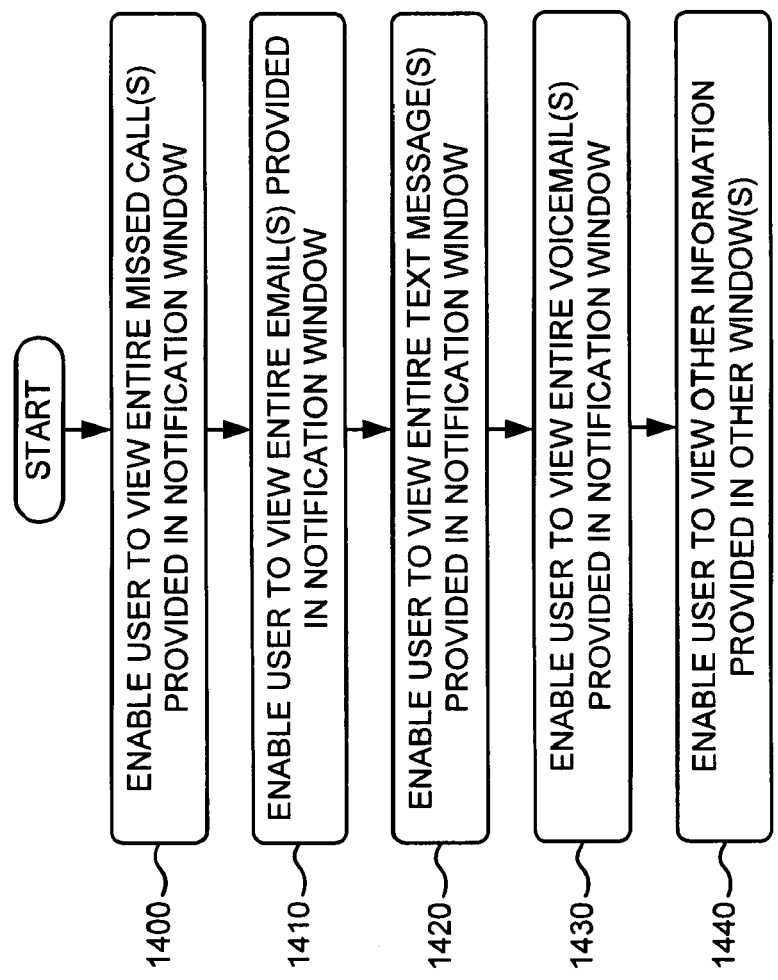

INTERACTIVE LOCKED STATE MOBILE COMMUNICATION DEVICE

BACKGROUND

Devices, such as mobile communication devices (e.g., cell phones, personal digital assistants (PDAs), etc.), include touch sensitive input devices (e.g., touch sensitive interfaces or displays, touch screens, etc.). Touch screens are usually formed with either a resistive or capacitive film layer, located above a display, which is used to sense a touch of the user's finger or a stylus. Some touch screens enable the user to input information (e.g., text, numbers, etc.) via interaction with information displayed on the touch screen. Mobile communication devices can be placed in a locked state (e.g., when not in use) to prevent their inadvertent use, or in a sleep state (or mode) to conserve energy.

However, such mobile communication devices do not permit the user to interact with the touch screen when the mobile communication device is in a locked state. In the locked state, the touch screen is also unable to display current information (e.g., missed calls, recently received text messages, recently received emails, etc.) received by the mobile communication device during the sleep state. Furthermore, when the touch screen is unlocked, the touch screen typically displays the last application used by the mobile communication device.

BRIEF DESCRIPTION OF THE DRAWINGS

FIG. 3 depicts a diagram of exemplary components of a display (e.g., a touch screen) of the device illustrated in FIG. 1;

FIG. 4 illustrates a diagram of exemplary current information capable of being received by the device depicted in FIG. 1, when the device is in a sleep and/or locked state;

FIGS. 5A and 5B depict diagrams of exemplary interactive touch screen operations capable of being performed by the device illustrated in FIG. 1, when the device is awake and in a locked state;

FIGS. 6A and 6B illustrate diagrams of exemplary interactive touch screen operations capable of being performed by the device depicted in FIG. 1, when the device is awake and in an unlocked state;

FIGS. 7A and 7B depict diagrams of exemplary download operations capable of being performed by the device illustrated in FIG. 1;

FIG. 8 illustrates a diagram of exemplary configuration options associated with the touch screen of the device depicted in FIG. 1; and FIGS. 9-14 depict flow charts of an exemplary process for interacting with a touch screen of a device in locked and unlocked states according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user to interact with a touch screen of a mobile communication device (e.g., a cell phone, a PDA, etc.) and to view current information when the mobile communication device is in a locked state. In one implementation, for example, the systems and/or methods may receive current information with a device, while the device is in a sleep (or locked) state, may associate one or more portions of the current information with one or more corresponding windows, and may receive an input to wake up the device in a locked state. The systems and/or methods may display, via a device display, the window(s) with the associated portion(s) of the current information while the device is in the locked state, may enable a user to manipulate, via the device display, the displayed window(s) while the device is in the locked state, and may receive an input to unlock the device. The systems and/or methods may continue to display the window(s) while the device is in the unlocked state, and may enable the user to activate one or more functions associated with the associated portion(s) of the current information.

As used herein, the term "user" is intended to be broadly interpreted to include a mobile communication device or a user of a mobile communication device. The term "touch screen," as used herein, is intended to be broadly interpreted to include a touch screen display, a touch sensitive input device, a touch sensitive interface, etc. The term "sleep state," as used herein, is intended to be broadly interpreted to include a low power mode for a mobile communication device that prevents having to reset programming codes or wait for the mobile communication device to reboot. The term "locked state," as used herein, is intended to be broadly interpreted to include a state where a mobile communication device is awake (e.g., in a non-sleep state) but functionality associated with the mobile communication device is limited to prevent inadvertent use. The term "unlocked state," as used herein, is intended to be broadly interpreted to include a state where a mobile communication device is awake (e.g., in a non-sleep state) and fully functional.

Figure 1:
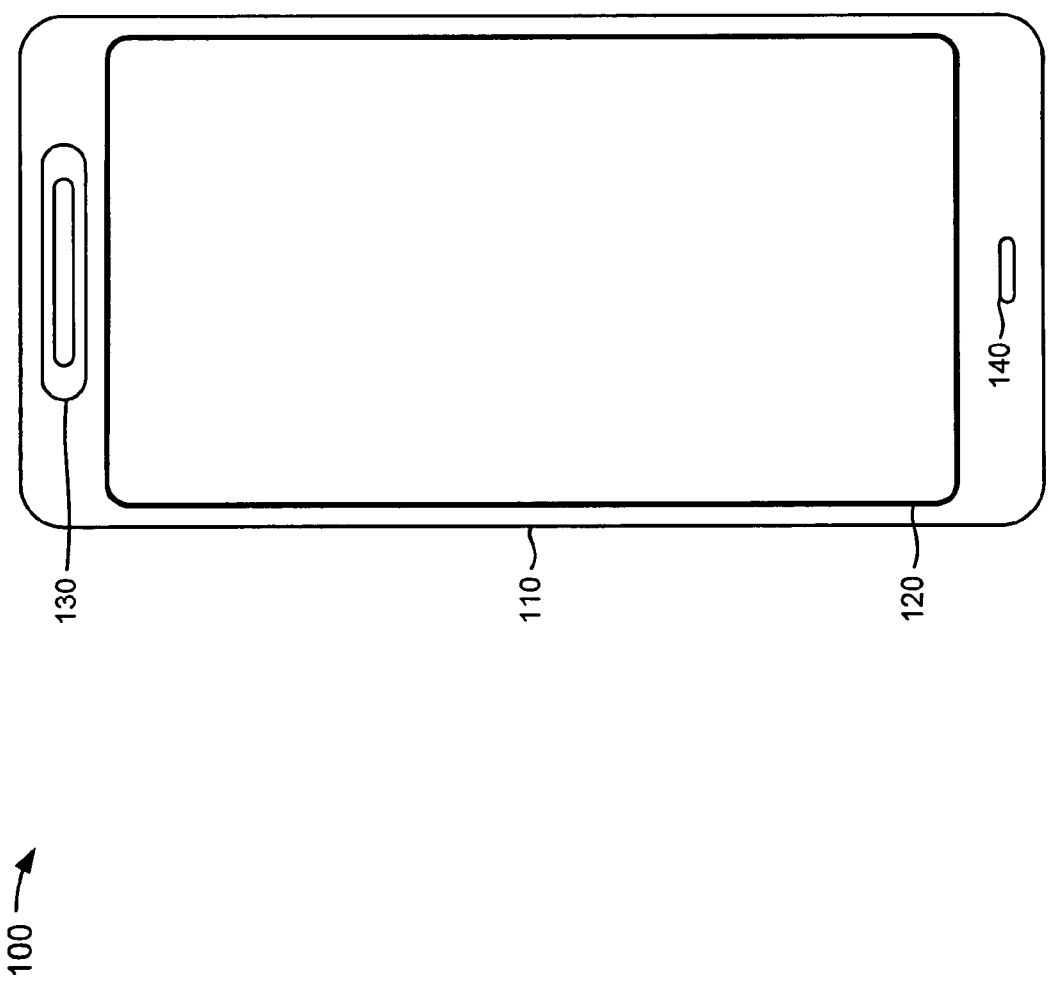
FIG. 1 depicts a diagram of an exemplary device in which systems and/or methods described herein may be implemented.

FIG. 1 is a diagram of an exemplary mobile communication device (hereinafter referred to as "device 100") in which systems and/or methods described herein may be implemented. Device 100 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a portable gaming system, a global positioning system (GPS) device, any other mobile communication device capable of utilizing a touch screen display, a thread or process running on one of these devices, and/or an object executable by one of these devices. As illustrated in FIG. 1, device 100 may include a housing 110, a display 120, a speaker 130, and/or a microphone 140.

Housing 110 may protect the components of device 100 from outside elements. Housing 110 may include a structure configured to hold devices and components used in device 100, and may be formed from a variety of materials. For example, housing 110 may be formed from plastic, metal, or a composite, and may be configured to support display 120, speaker 130, and/or microphone 140.

Display 120 may provide visual information to the user. For example, display 120 may display text input into device 100, text, images, video, and/or graphics received from another device, and/or information regarding incoming or outgoing calls or text messages, emails, media, games, phone books, address books, the current time, etc. In one implementation, display 120 may include a touch screen display that may be configured to receive a user input when the user touches display 120. For example, the user may provide an input to display 120 directly, such as via the user's finger, or via other input objects, such as a stylus. User inputs received via display 120 may be processed by components and/or devices operating in device 100. The touch screen display may permit the user to interact with device 100 in order to cause device 100 to perform one or more operations. Further details of display 120 are provided below in connection with, for example, FIGS. 2-8.

Speaker 130 may provide audible information to a user of device 100. Speaker 130 may be located in an upper portion of device 100, and may function as an ear piece when a user is engaged in a communication session using device 100. Speaker 130 may also function as an output device for music and/or audio information associated with games and/or video images played on device 100.

Microphone 140 may receive audible information from the user. Microphone 140 may include a device that converts speech or other acoustic signals into electrical signals for use by device 100. Microphone 140 may be located proximate to a lower side of device 100.

Although FIG. 1 shows exemplary components of device 100, in other implementations, device 100 may contain fewer, different, differently arranged, or additional components than depicted in FIG. 1. In still other implementations, one or more components of device 100 may perform one or more other tasks described as being performed by one or more other components of device 100.

Figure 2:
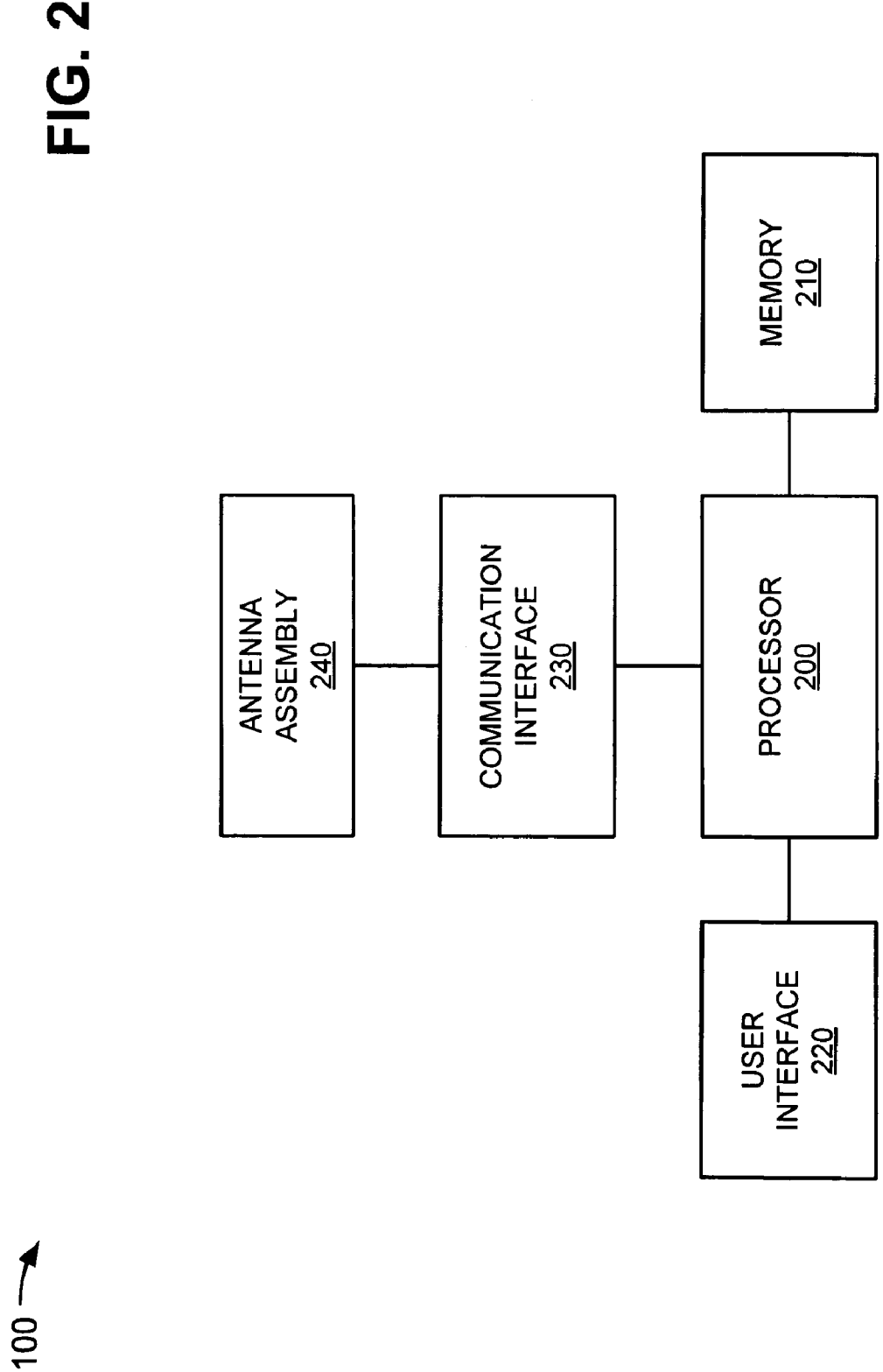
FIG. 2 illustrates a diagram of exemplary components of the device depicted in FIG. 1.

FIG. 2 illustrates a diagram of exemplary components of device 100. As illustrated, device 100 may include a processor 200, memory 210, a user interface 220, a communication interface 230, and/or an antenna assembly 240.

Processor 200 may include one or more microprocessors, application-specific integrated circuits (ASICs), field-programmable gate arrays (FPGAs), or the like. Processor 200 may control operation of device 100 and its components. In one implementation, processor 200 may control operation of components of device 100 in a manner described herein.

Memory 210 may include a random access memory (RAM), a read-only memory (ROM), and/or another type of memory to store data and instructions that may be used by processor 200.

User interface 220 may include mechanisms for inputting information to device 100 and/or for outputting information from device 100. Examples of input and output mechanisms might include buttons (e.g., control buttons, keys of a keypad, a joystick, etc.) or a touch screen interface (e.g., display 120) to permit data and control commands to be input into device 100; a speaker (e.g., speaker 130) to receive electrical signals and output audio signals; a microphone (e.g., microphone 140) to receive audio signals and output electrical signals; a display (e.g., display 120) to output visual information (e.g., text input into device 100); a vibrator to cause device 100 to vibrate; etc.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

As will be described in detail below, device 100 may perform certain operations described herein in response to processor 200 executing software instructions of an application contained in a computer-readable medium, such as memory 210. A computer-readable medium may be defined as a physical or logical memory device. A logical memory device may include memory space within a single physical memory device or spread across multiple physical memory devices. The software instructions may be read into memory 210 from another computer-readable medium or from another device via communication interface 230. The software instructions contained in memory 210 may cause processor 200 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 100, in other implementations, device 100 may contain fewer, different, differently arranged, or additional components than depicted in FIG. 2. In still other implementations, one or more components of device 100 may perform one or more other tasks described as being performed by one or more other components of device 100.

FIG. 3 depicts a diagram of exemplary components of display 120 of device 100. As shown, display 120 may include a light source 300, a screen 310, and/or a sensing layer 320.

Light source 300 may include a mechanism (e.g., a backlight) that provides backlighting to a lower surface of screen 310 in order to display information. For example, light source 300 may include one or more incandescent light bulbs, one or more light-emitting diodes (LEDs), an electroluminescent panel (ELP), one or more cold cathode fluorescent lamps (CCFL), one or more hot cathode fluorescent lamps (HCFL), etc. that illuminate portions of screen 310. Incandescent light bulbs may be used when very high brightness is desired. LEDs may be used in small, inexpensive lighting arrangements, and may include colored or white light. An ELP may be used for larger lighting arrangements or when even lighting is desired, and may be either colored or white. CCFLs may be used in large lighting arrangements and may be white in color. In another example, light source 300 may employ one or more diffusers or light guides to provide even lighting from an uneven source. In still another example, light source 300 can include any color light source (e.g., yellow, green, blue, white, etc.) or any combination of colored/non-colored light sources. The light provided by light source 300 may also be used to provide front lighting to an upper surface of screen 310 that faces a user.

Screen 310 may include any mechanism capable of providing visual information (e.g., text, images, video, incoming or outgoing calls, games, phone books, the current time, emails, etc.) to a user. For example, screen 310 may include a liquid crystal display (LCD), such as a thin film transistor (TFT) LCD, etc. In one exemplary implementation, screen 310 may include a plastic substrate that arranges TFT on a metal foil (rather than on glass), which may permit screen 310 to recover its original shape after being bent. Screen 310 may include a color filter coated onto the plastic substrate, which may permit screen 310 to display color images. In other implementations, screen 310 may include a monochrome LCD.

In one implementation, screen 310 may include any number of color and/or monochrome pixels. In another implementation, screen 310 may include a passive-matrix structure or an active-matrix structure. In a further implementation, if screen 310 is a color array, each pixel may be divided into three cells, or subpixels, which may be colored red, green, and blue by additional filters (e.g., pigment filters, dye filters, metal oxide filters, etc.). Each subpixel may be controlled independently to yield numerous possible colors for each pixel. In other implementations, each pixel of screen 310 may include more or less than three subpixels of various colors other than red, green, and blue.

Sensing layer 320 may include a mechanism that detects the presence of an input object 330 (e.g., a user's finger, a stylus, etc.) on display 120, detects the location (or touch area) of input object 330 on display 120, determines how many fingers a user has on display 120, etc. For example, sensing layer 320 may include a layer of capacitive material (e.g., provided under a protective covering (not shown)) that may experience a change in electrical charges (e.g., a change in the amount of charge stored) when finger 330 contacts sensing layer 320. In one exemplary implementation, sensing layer 320 may include self capacitance circuitry that includes an array of electrodes and monitors changes in the array of electrodes when a user contacts sensing layer 320 (e.g., with finger 330). In another exemplary implementation, sensing layer 320 may include a layer of driving lines that carry current, and a separate layer of sensing lines that detect changes in electrical charge when a user contacts sensing layer 320.

Sensing layer 320 may sense a change associated with its electrical properties every time a user contacts sensing layer 320, and may provide this information to processor 200 and/or memory 210. Processor 200 may utilize this information to determine a shape, a size, and/or a location of a user's finger (or fingers) on display 120.

Although FIG. 3 shows exemplary components of display 120, in other implementations, display 120 may contain fewer, different, differently arranged, or additional components than depicted in FIG. 3. In still other implementations, one or more components of display 120 may perform one or more other tasks described as being performed by one or more other components of display 120.

FIG. 4 illustrates a diagram of exemplary current information 400 capable of being received by device 100 when device 100 is in a sleep state and/or a locked state. In one implementation, current information 400 may be received via communication interface 230 and antenna assembly 240, may be stored in memory 210, and/or may be displayed via display 120. Display 120 may include the features described above in connection with FIGS. 1 and 3. As further shown in FIG. 4, current information 400 may include Really Simple Syndication (RSS) feeds 410, calls 420, emails 430, text messages 440, voicemails 450, weather information 460, time/date information 470, etc.

RSS feeds 410 may include one or more feeds for frequently updated content, such as news, stocks, blog entries, news headlines, audio, video etc. RSS feeds 410 may include full or summarized text, metadata (e.g., publishing dates and authorship), and other information. RSS feeds 410 may be received using software such as an RSS reader, a feed reader, or an aggregator. A user of device 100 may subscribe to RSS feeds 410 by entering uniform resource locators (URLs) associated with RSS feeds 410 into the RSS reader. The RSS reader may check the user's subscribed to RSS feeds 410 regularly for new content, and may download any updates (e.g., to device 100).

Calls 420 may include one or more telephone calls received by device 100 when device 100 is in the sleep and/or locked states. For example, calls 420 may include calls received from other mobile communication devices, PDAs, voice-over-Internet protocol (VoIP) devices, standard telephones, etc.

Emails 430 may include one or more emails received by device 100 when device 100 is in the sleep and/or locked states. For example, emails 430 may include emails received from other mobile communication devices, PDAs, VoIP devices, laptop computers, personal computers, etc.

Text messages 440 may include one or more text (or Short Message Service (SMS)) messages received by device 100 when device 100 is in the sleep and/or locked states. For example, text messages 440 may include text messages received from other mobile communication devices, PDAs, VoIP devices, laptop computers, personal computers, etc.

Voicemails 450 may include one or more voicemail messages received by device 100 when device 100 is in the sleep and/or locked states. For example, voicemails 450 may include voicemail messages received from other mobile communication devices, PDAs, voice-over-Internet protocol (VoIP) devices, standard telephones, etc.

Weather information 460 may include forecasts (e.g., a daily forecast, a weekly forecast, etc.), temperature information (e.g., a high temperature, a low temperature, a current temperature, etc.), and/or other weather-related information for a location associated with device 100 and/or for a user-defined location (e.g., unassociated with device 100).

Time/date information 470 may include a current time (e.g., 12:00 PM) and/or a current date (e.g., a day of the week (e.g., Monday), a month (e.g., February), a day of the month (e.g., the 15th), etc.) for a location associated with device 100 and/or a user-defined location (e.g., unassociated with device 100).

Although FIG. 4 shows exemplary current information 400 that may be received by device 100, in other implementations, device 100 may receive less, different, or additional information than depicted in FIG. 4. In one exemplary implementation, device 100 may receive current information 400 (or other similar information) when device 100 is in an unlocked state.

FIGS. 5A and 5B depict diagrams of exemplary interactive touch screen operations 500 capable of being performed by device 100 when device 100 is awake (e.g., in a non-sleep state) and in a locked state. In one implementation, the operations described in connection with FIGS. 5A and 5B may be performed by processor 200 (FIG. 2). As shown in FIGS. 5A and 5B, device 100 may include display 120. Display 120 may include the features described above in connection with FIGS. 1 and 3. As further shown in FIG. 5A, display 120 may display a stock RSS window 505, a time/date window 510, a weather window 515, and/or a notification window 520.

A "window," as used herein, is intended to be broadly interpreted to include any display mechanism (e.g., a window, a menu, etc.) capable of being displayed by display 120 and of displaying current (or live) information (e.g., current information 400) received by device 100 when device 100 is in the locked state. For example, a window may include an enclosed area on a display screen (e.g., display 120) that may display information and/or may permit execution of an application (e.g., by device 100). The number of windows provided by display 120, the types of windows (e.g., weather, notification, etc.), the types of information provided in windows (e.g., weather information for particular city, certain stocks, etc.), the arrangement of windows on display 120, etc. may be configured by a user of device 100. Further details of configuring windows are provided below in connection with, for example, FIG. 8.

In one exemplary implementation, device 100 may receive current information 400 (e.g., RSS feeds 410, calls 420, emails 430, text messages 440, voicemails 450, weather information 460, time/date information 470, etc.) when device 100 is in a sleep/locked state, and may associate current information 400 with one or more of stock RSS window 505, time/date window 510, weather window 515, and/or notification window 520. For example, device 100 may associate RSS feeds 410 with stock RSS window 505, may associate calls 420, emails 430, text messages 440, and voicemails 450 with notification window 520, may associate weather information 460 with weather window 515, and may associate time/date information 470 with time/date window 510.

If a user provides an input to wake up device 100 (e.g., via selecting a portion of display 120), device 100 may receive the input and may wake up (e.g., may illuminate display 120) in a locked state. Device 100 may display (e.g., via display 120 and while still in a locked state) one or more of stock RSS window 505, time/date window 510, weather window 515, and/or notification window 520, as well as any associated current information 400. For example, device 100 may display portions of RSS feeds 410 in stock RSS window 505, may display portions of calls 420, emails 430, text messages 440, and voicemails 450 in notification window 520, may display portions of weather information 460 in weather window 515, and may display portions of time/date information 470 time/date window 510.

Stock RSS window 505 may include a window that displays current stock information (e.g., as configured by a user of device 100) received via RSS feeds (e.g., RSS feeds 410). For example, the user may configure device 100 to include stock information for five companies (e.g., companies associated with ticker symbols "AAA," "BBB," "CCC," "DDD," and "EEE") in stock RSS window 505. Device 100 may receive current stock information (e.g., via RSS feeds 410) associated with the five companies (e.g., current gains and/or losses associated with the five companies' stocks), may associate the current stock information with stock RSS window 505, and may display the current stock information in stock RSS window 505 (e.g., while device 100 is in a locked state).

Time/date window 510 may include a window that displays current time and/or date information (e.g., as configured by the user) received via time/date information 470. For example, the user may configure device 100 to include a current time (e.g., "12:20 PM") and date (e.g., "Mon. February 15"), of a geographic location associated with device 100, in time/date window 510. Device 100 may receive the current time and date (e.g., via time/date information 470), may associate the current time and date with time/date window 510, and may display the current time and date in time/date window 510 (e.g., while device 100 is in a locked state).

Weather window 515 may include a window that displays current weather information (e.g., as configured by the user) received via weather information 460. For example, the user may configure device 100 to include current weather information (e.g., a high temperature—"85°", a low temperature—"65°", a current temperature—"79°", current conditions—sunny, etc.) for a location (e.g., "Philadelphia") in weather window 515. Device 100 may receive the current weather information (e.g., via weather information 460) for Philadelphia, may associate the current weather information with weather window 515, and may display the current weather information in weather window 515 (e.g., while device 100 is in a locked state).

Notification window 520 may include a window that displays current notification information (e.g., as configured by the user) received from a variety of sources (e.g., via calls 420, emails 430, text messages 440, voicemails 450, etc.). For example, as shown in FIG. 5A, the user may configure device to include a text message 525, a missed call 530, a voicemail 535, an email 540, and a reminder 545 in notification window 520. Although FIG. 5A shows only a single text message 525, missed call 530, voicemail 535, email 540, and reminder 545 in notification window 520, in other implementations, notification window 520 may include more text messages 525, missed calls 530, voicemails 535, emails 540, and/or reminders 545. Device 100 may receive text message 525, missed call 530, voicemail 535, email 540, and reminder 545 (e.g., via calls 420, emails 430, text messages 440, voicemails 450, etc.), may associate text message 525, missed call 530, voicemail 535, email 540, and reminder 545 with notification window 545, and may display text message 525, missed call 530, voicemail 535, email 540, and reminder 545 in notification window 520 (e.g., while device 100 is in a locked state). In exemplary implementations, device 100 may arrange notification information displayed in notification window 520 based on time received (e.g., as shown in FIG. 5A), alphabetically based on names associated with the notification information, based on the type of notification (e.g., text messages first, followed by emails, etc.), etc.

Text message 525 may include an image associated with an originator of the text message, a name (e.g., "Amy") of the originator of the text message, a time (e.g., "11:55 AM") when the text message was received by device 100, an icon symbolizing a text message, etc. In one exemplary implementation, although not shown in FIG. 5A, text message 525 may include some or all of a message contained in text message 525.

Missed call 530 may include an image associated with an originator of the missed call, a name (e.g., "Kevin") of the originator of the missed call, a time (e.g., "10:29 AM") when the missed call was received by device 100, an icon symbolizing a missed call, etc. In one exemplary implementation, although not shown in FIG. 5A, missed call 530 may include some or all of the call information (e.g., a phone number as associated with Kevin, etc.) associated with missed call 530.

Voicemail 535 may include an image associated with an originator of the voicemail, a name (e.g., "Michelle") of the originator of the voicemail, a time (e.g., "Yesterday") when the voicemail was received by device 100, an icon symbolizing a voicemail, etc. In one exemplary implementation, although not shown in FIG. 5A, voicemail 535 may include some or all of the call information (e.g., a phone number as associated with Michelle, a duration of the voicemail, etc.) associated with voicemail 535.

Email 540 may include an image associated with an originator of the email, a name (e.g., "Tim") of the originator of the email, a time (e.g., "Yesterday") when the email was received by device 100, an icon symbolizing an email, etc. In one exemplary implementation, although not shown in FIG. 5A, email 540 may include some or all of a message contained in email 540.

Reminder 545 may include an image associated with an originator of the reminder, a name (e.g., "John") of the originator of the reminder, a time (e.g., "Last Saturday") when the reminder was received by device 100, an icon symbolizing a reminder, etc. In one exemplary implementation, although not shown in FIG. 5A, reminder 545 may include some or all of the details (e.g., an anniversary, a birthday, etc.) associated with reminder 545. In another exemplary implementation, reminder 545 may be provided to device 100 by the user of device 100 (e.g., rather than received from another user).

As further shown in FIG. 5A, display 120 may provide a lock/unlock mechanism 550 that includes a locked position 555 and an image 560 (e.g., a locked padlock) indicating that device 100 is in a locked state. Lock/unlock mechanism 550 may include a touch screen-based mechanism that requires the user to slide his/her finger (or a stylus) from locked position 555 (e.g., in the bottom left corner of display 120), along an arc, to the bottom right corner of display 120 (e.g., the unlocked position, as shown in FIGS. 6A-7B).

As shown in FIG. 5B, device 100 may enable a user (e.g., via input object 330, such as the user's finger) to manipulate one or more of stock RSS window 505, time/date window 510, weather window 515, and/or notification window 520, as well as information (e.g., entries) provided in windows 505-520 when device 100 is still in a locked state. In one exemplary implementation, device 100 may enable a user (e.g., via input object 330) to resize, reshape, move, zoom, expand, scroll, etc. one or more of stock RSS window 505, time/date window 510, weather window 515, and/or notification window 520 when device 100 is in a locked state. In other implementations, device 100 may enable a user (e.g., via input object 330) to resize, reshape, move, zoom, expand, scroll, etc. one or more entries associated with windows 505-520 when device 100 is in a locked state.

For example, as shown in FIG. 5B, a user (e.g., via input object 330) may wish to manipulate an entry, as indicated by reference number 565, provided in notification window 520 when device 100 is in a locked state. The user may touch (e.g., with input object 330) display 120 where manipulated entry 565 is located, and may slide input object 330 downward to cause display 120 to further reveal additional entries 570 and 575 associated with manipulated entry 565 (e.g., additional entries provided by Kevin). As further shown in FIG. 5B, additional entry 570 may include a text message provided by Kevin on Monday at 2:23 PM, and additional entry 575 may include a reminder provided by Kevin on Tuesday at 9:41 PM. If more additional entries are associated with manipulated entry 565, device 100 may enable the user to scroll through the additional entries via manipulation of display 120.

Although FIGS. 5A and 5B show exemplary interactive touch screen operations 500 associated with device 100, when device 100 is awake and in a locked state, in other implementations, device 100 may perform fewer, different, or additional operations than depicted in FIGS. 5A and 5B.

FIGS. 6A and 6B illustrate diagrams of exemplary interactive touch screen operations 600 capable of being performed by device 100 when device 100 is awake and in an unlocked state. In one implementation, the operations described in connection with FIGS. 6A and 6B may be performed by processor 200 (FIG. 2). As shown in FIGS. 6A and 6B, device 100 may include display 120. Display 120 may include the features described above in connection with FIGS. 1 and 3. As further shown in FIG. 6A, device 100 may be in an unlocked state due to the user manipulating lock/unlock mechanism 550 and moving lock/unlock mechanism 550 to an unlocked position 610. Lock/unlock mechanism 550 may display an image 620 (e.g., an unlocked padlock) indicating that device 100 is in an unlocked state.

Unlike some touch screen devices, which return a user to a last-used application when the user unlocks the device, device 100 may continue to display the interface provided by display 120 when device 100 was in a locked state. For example, as shown in FIG. 6A, display 120 may provide the same interface as shown in FIG. 5B (e.g., including stock RSS window 505, time/date window 510, weather window 515, and notification window 520 (e.g., in its manipulated state)), when device 100 was in a locked state. If device 100 is in an unlocked state, the user may manipulate (e.g., resize, move, etc.) display 120 in the manner described above in connection with FIG. 5B. However, once device 100 is in an unlocked state, user manipulation of display 120 may activate functions associated with the information provided by display 120. For example, if the user selects (e.g., via input object 330) an entry 630 (e.g., missed call 530 received from Kevin), device 100 may activate the functions associated with entry 630 (e.g., device 100 may display all information associated with entry 630).

As shown in FIG. 6B, activation of the functions associated with entry 630 may cause device 100 to display (e.g., via display 120) missed call information 640, a first selection mechanism 650, and a second selection mechanism 660.

Missed call information 640 may include information associated with missed call 530 received from Kevin. For example, missed call information 640 may include identification information (e.g., "Missed call from Kevin"), a time associated with missed call 530 (e.g., "10:29 AM"), a date associated with missed call 530 (e.g., "Mon. February 15"), a phone number associated with Kevin (e.g., "(888) 888-7777").

First selection mechanism 650 may include a button, an icon, a link, and/or other similar selection mechanisms (e.g., a "Call Kevin" button) that, when selected, instructs device 100 to call Kevin (e.g., at "(888) 888-7777"). Second selection mechanism 660 may include a button, an icon, a link, and/or other similar selection mechanisms (e.g., a "Return Home" button) that, when selected, instructs device 100 to return to the interface depicted in, for example, FIG. 6A. In such an arrangement, device 100 may enable the user to quickly and easily connect with people who recently communicated with device 100 (e.g., via a call, a text message, etc.).

Although FIGS. 6A and 6B show exemplary interactive touch screen operations 600 associated with device 100, when device 100 is awake and in a locked state, in other implementations, device 100 may perform fewer, different, or additional operations than depicted in FIGS. 6A and 6B.

Figure 7A:
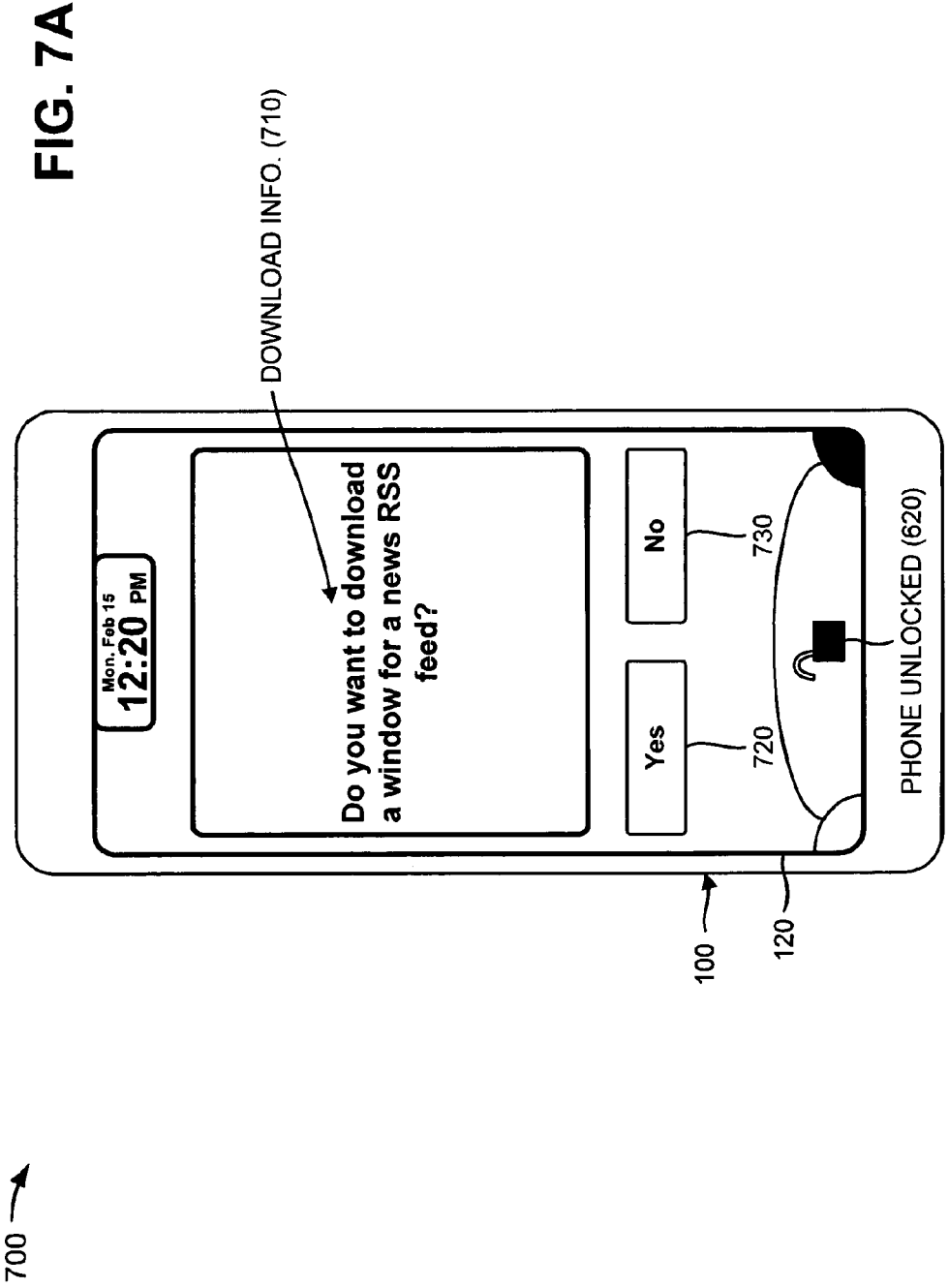

FIGS. 7A and 7B depict diagrams of exemplary download operations 700 capable of being performed by device 100. In one implementation, the operations described in connection with FIGS. 7A and 7B may be performed by processor 200 (FIG. 2). As shown in FIGS. 7A and 7B, device 100 may include display 120. Display 120 may include the features described above in connection with FIGS. 1 and 3. As further shown in FIGS. 7A and 7B, device 100 may be in an unlocked state as indicated by image 620 (e.g., an unlocked padlock).

As described above, a user may configure the number of windows provided by display 120, the types of windows (e.g., weather, notification, etc.), the types of information provided in windows (e.g., weather information for particular city, certain stocks, etc.), the arrangement of windows on display 120, etc. Furthermore, the user may download one or more additional windows to be provided by display 120. In such an arrangement, device 100 may connect with a service (e.g., a server) associated with a provider of windows (e.g., a service that enables the user to browse, select, download, etc. a variety of windows offered by the provider). As shown in FIG. 6A, if the user wishes to download one or more additional windows, the user may select a download option (e.g., via a menu, an icon, etc.) provided by device 100 and device 100 may provide (e.g., via display 120) download information 710, a first selection mechanism 720, and a second selection mechanism 730.

Download information 710 may ask a user whether the user wants device 100 to download a window (e.g., for a news RSS feed) for display via display 120. In other implementations, download information 710 may ask the user whether the user wants device 100 to download one or more other windows for display via display 120.

First selection mechanism 720 may include a button, an icon, a link, and/or other similar selection mechanisms (e.g., a "Yes" button) that, when selected, instructs device 100 to download the window for the news RSS feed. Second selection mechanism 730 may include a button, an icon, a link, and/or other similar selection mechanisms (e.g., a "No" button) that, when selected, instructs device 100 to not download the window for the news RSS feed.

If the user selects the first selection mechanism 720, device 100 may access the provider's service, may download the window for the RSS news feed, and may store information associated with the window for the RSS news feed (e.g., in memory 210). In one implementation, device 100 may provide (e.g., via display 120) a news RSS window 740 (as shown in FIG. 7B) along with one or more other windows provided by display 120 (e.g., stock RSS window 505, time/date window 510, weather window 515, and/or notification window 520), as shown in FIG. 7B.

News RSS window 740 may include a window that displays current news information (e.g., as configured by a user of device 100) received via RSS feeds (e.g., RSS feeds 410). For example, the user may configure device 100 to include four types of news information (e.g., "Economic News," "World News," "U.S. News," and "Local News") in news RSS window 740. Device 100 may receive current news information (e.g., via RSS feeds 410) associated with the four types of news, may associate the current news information with news RSS window 740, and may display the current news information in news RSS window 740 (e.g., while device 100 is in a locked state). In one implementation, the user may manipulate (e.g., move, resize, etc.) news RSS window 740 in the manner described above in connection with FIG. 5B (e.g., while device 100 is in a locked state) and/or in the manner described above in connection with FIGS. 6A and 6B (e.g., while device 100 is in an unlocked state).

Although FIGS. 7A and 7B show exemplary download operations 700 associated with device 100, in other implementations, device 100 may perform fewer, different, or additional operations than depicted in FIGS. 7A and 7B.

FIG. 8 illustrates a diagram of exemplary configuration options 800 associated with the touch screen (e.g., display 120) of device 100. Display 120 may include the features described above in connection with FIGS. 1 and 3. Configuration options 800 may enable a user to configure windows (e.g., stock RSS window 505, time/date window 510, weather window 515, and/or notification window 520) provided by display 120, and/or to filter information provided in the windows. As shown in FIG. 8, configuration options 800 may include configuration options 810 for notification window 520, configuration options 820 for stocks RSS window 505, and/or configuration options 830 for weather window 515.

Configuration options 810 may provide a variety of options 840 for configuring notification window 520. For example, as shown in FIG. 8, options 840 may include an update rate (e.g., when device 100 is locked and awake) for receiving information associated with notification window 520 (e.g., receive information every ten seconds), an update rate (e.g., when device 100 is asleep) for receiving information associated with notification window 520 (e.g., receive information every ten minutes), notification types to be associated with notification window 520 (e.g., email, text message, etc.), display options for notification window 520 (e.g., sort by date, by person, etc.), etc.

Configuration options 820 may provide a variety of options 850 for configuring stock RSS window 505. For example, as shown in FIG. 8, options 850 may include an update rate (e.g., when device 100 is locked and awake) for receiving information associated with stock RSS window 505 (e.g., receive information every five seconds), an update rate (e.g., when device 100 is asleep) for receiving information associated with stock RSS window 505 (e.g., receive information every five minutes), particular stocks to be associated with stock RSS window 505 (e.g., "AAA," "BBB," etc.), display options for stock RSS window 505 (e.g., display ticker symbol, etc.), etc.

Configuration options 830 may provide a variety of options 860 for configuring weather window 515. For example, as shown in FIG. 8, options 860 may include an update rate (e.g., when device 100 is locked and awake) for receiving information associated with weather window 515 (e.g., receive information every five seconds), an update rate (e.g., when device 100 is asleep) for receiving information associated with weather window 515 (e.g., receive information every five minutes), a weather location to be associated with weather window 515 (e.g., "Philadelphia, Pa.," etc.), display options for weather window 515 (e.g., display location, temperatures, etc.), etc.

Although FIG. 8 shows exemplary configuration options 800 associated with display 120, in other implementations, display 120 may include fewer, different, or additional configuration options than depicted in FIG. 8. For example, in one implementation, regardless of the update rate associated with a configuration option (e.g., the update rate of five minutes associated with stock RSS window 505), device 100 may implement a "push" technology and may push (or provide) breaking news (e.g., a stock market crash) to stock RSS window 505 immediately. In another example, device 100 may "push" (or provide) dangerous weather information (e.g., a tornado) to weather window 515 regardless of the update rate associated with weather window 515. Such an arrangement may enable the user of device 100 to be made immediately aware of important information without waiting for device 100 to update.

FIGS. 9-14 depict flow charts of an exemplary process 900 for interacting with a touch screen of a device in locked and unlocked states according to implementations described herein. In one implementation, process 900 may be performed by device 100. In another implementation, some or all of process 900 may be performed by another device or group of devices, including or excluding device 100.

As illustrated in FIG. 9, process 900 may begin with receiving current information with a device while the device is in a sleep or locked state (block 910), associating one or more portions of the current information with one or more corresponding windows (block 920), and receiving an input to wake up the device in a locked state (block 930). For example, in implementations described above in connection with FIG. 5A, device 100 may receive current information 400 when device 100 is in a sleep state, and may associate current information 400 with one or more of stock RSS window 505, time/date window 510, weather window 515, and/or notification window 520. If a user provides an input to wake up device 100 (e.g., via selecting a portion of display 120), device 100 may receive the input and may wake up (e.g., may illuminate display 120) in a locked state.

As further shown in FIG. 9, the window(s) with the associated portion(s) of the current information may be displayed, via a display of the device, while the device is in a locked state (block 940), and the user may be enabled to manipulate the displayed window(s) while the device is in the locked state (block 950). For example, in implementations described above in connection with FIGS. 5A and 5B, device 100 may display (e.g., via display 120 and while still in a locked state) one or more of stock RSS window 505, time/date window 510, weather window 515, and/or notification window 520, as well as any associated current information 400. Device 100 may enable a user (e.g., via input object 330, such as the user's finger) to manipulate one or more of stock RSS window 505, time/date window 510, weather window 515, and/or notification window 520, as well as information (e.g., entries) provided in windows 505-520, when device 100 is still in a locked state. In one example, device 100 may enable a user (e.g., via input object 330) to resize, reshape, move, zoom, etc. one or more of stock RSS window 505, time/date window 510, weather window 515, and/or notification window 520 when device 100 is in a locked state.

Returning to FIG. 9, an input to unlock the device may be received (block 960), the window(s) may continue to be displayed while the device is in an unlocked state (block 970), and the user may be enabled to activate one or more functions associated with the portion(s) of the current information (block 980). For example, in implementations described above in connection with FIGS. 6A and 6B, device 100 may be in an unlocked state due to the user manipulating lock/unlock mechanism 550 and moving lock/unlock mechanism 550 to unlocked position 610. In an unlocked state, device 100 may continue to display the interface provided by display 120 when device 100 was in a locked state. If device 100 is in an unlocked state, the user may manipulate (e.g., resize, move, etc.) display 120 in the manner described above in connection with FIG. 5B. However, once device 100 is in an unlocked state, user manipulation of display 120 may activate functions associated with the information provided by display 120. In one example, if the user selects (e.g., via input object 330) entry 630 (e.g., missed call 530 received from Kevin), device 100 may activate the functions associated with entry 630. Activation of the functions associated with entry 630 may cause device 100 to display (e.g., via display 120) missed call information 640, first selection mechanism 650, and second selection mechanism 650.

Figure 10:
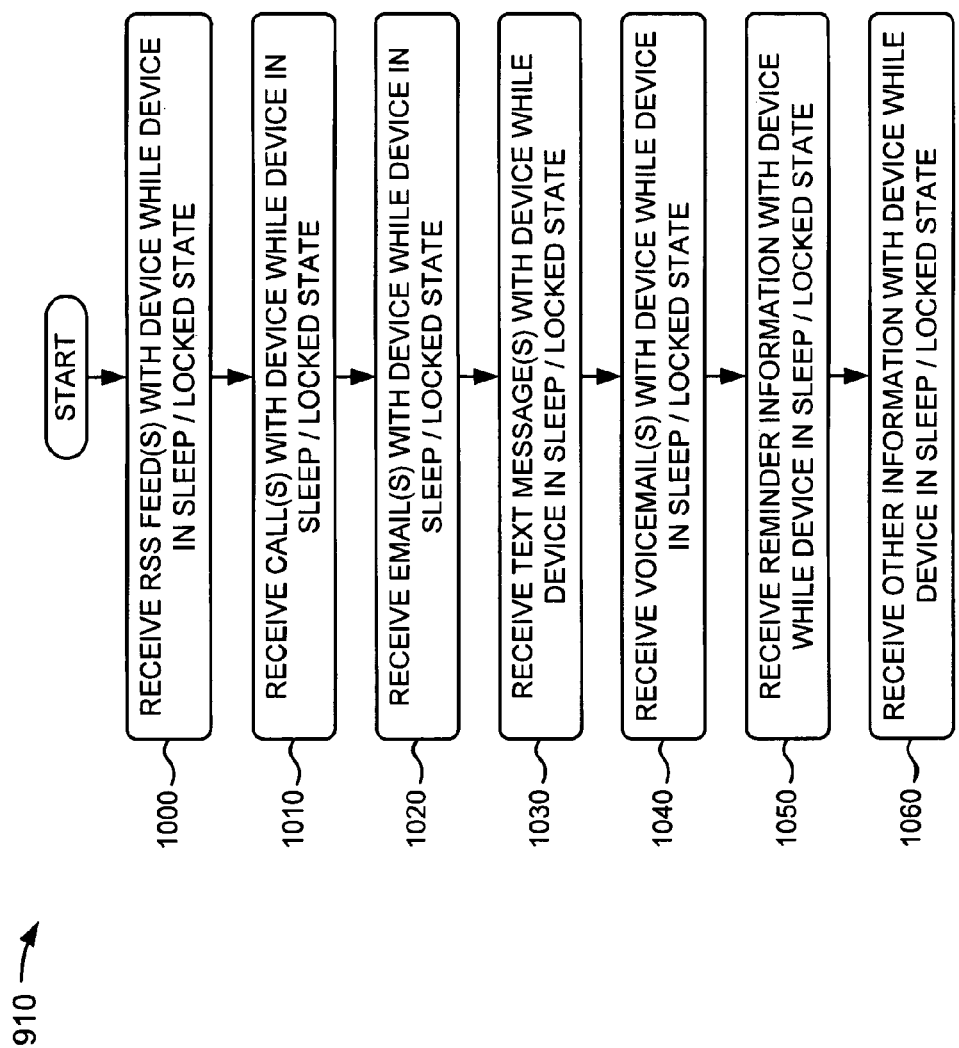

Process block 910 may include the process blocks illustrated in FIG. 10. As shown in FIG. 10, process block 910 may include, while the device is in the sleep or locked state, receiving one or more RSS feeds with the device (block 1000), receiving one or more calls with the device (block 1010), receiving one or more emails with the device (block 1020), receiving one or more text messages with the device (block 1030), receiving one or more voicemails with the device (block 1040), receiving reminder information with the device (block 1050), and/or receiving other information with the device (block 1060). For example, in implementations described above in connection with FIG. 4, device 100 may receive current information 400 when device 100 is in a sleep state and/or a locked state. Current information 400 may include RSS feeds 410, calls 420, emails 430, text messages 440, voicemails 450, weather information 460, time/date information 470, etc.

Figure 11:
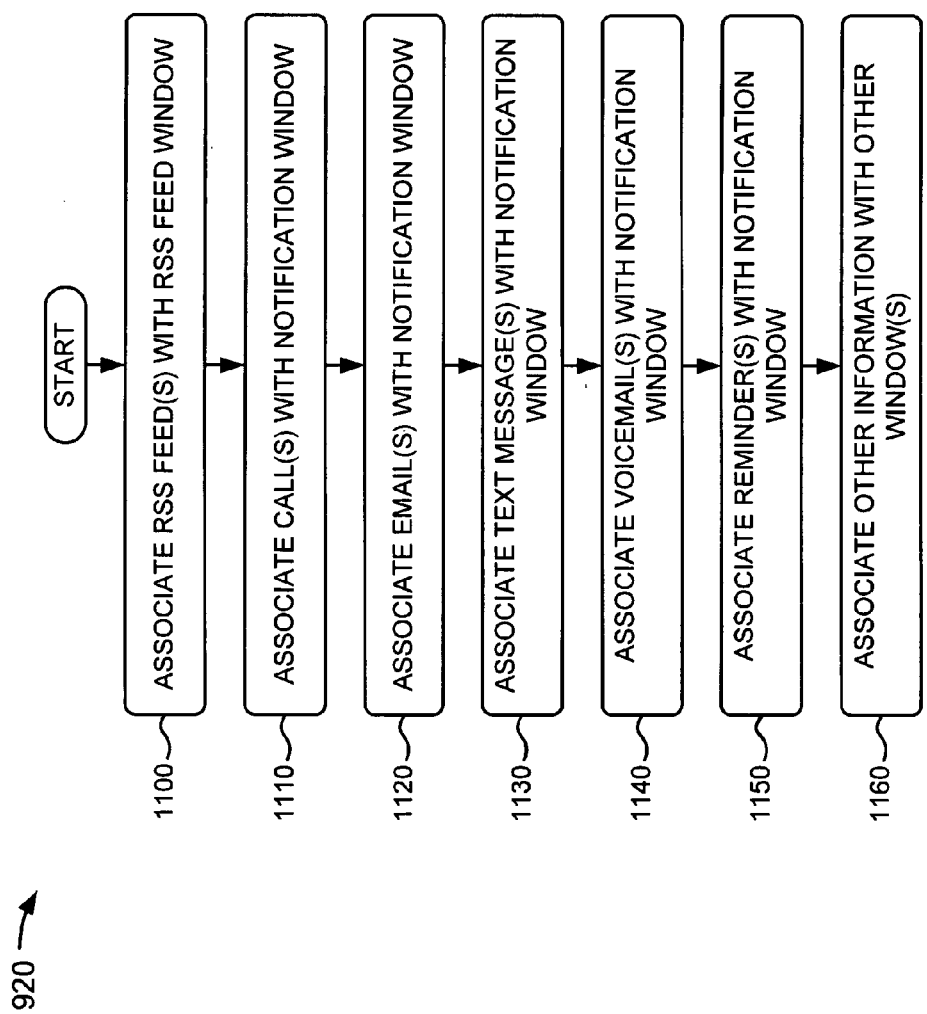

Process block 920 may include the process blocks illustrated in FIG. 11. As shown in FIG. 11, process block 920 may include associating one or more RSS feeds with an RSS feed window (block 1100), associating one or more calls with a notification window (block 1110), associating one or more emails with the notification window (block 1120), associating one or more text messages with the notification window (block 1130), associating one or more voicemails with the notification window (block 1140), associating one or more reminders with the notification window (block 1150), and/or associating other information with one or more other windows (block 1160). For example, in implementations described above in connection with FIG. 5A, device 100 may receive current information 400 (e.g., RSS feeds 410, calls 420, emails 430, text messages 440, voicemails 450, weather information 460, time/date information 470, etc.) when device 100 is in a sleep/locked state, and may associate current information 400 with one or more of stock RSS window 505, time/date window 510, weather window 515, and/or notification window 520. In one example, device 100 may associate RSS feeds 410 with stock RSS window 505, may associate calls 420, emails 430, text messages 440, and voicemails 450 with notification window 520, may associate weather information 460 with weather window 515, and may associate time/date information 470 with time/date window 510.

Figure 12:
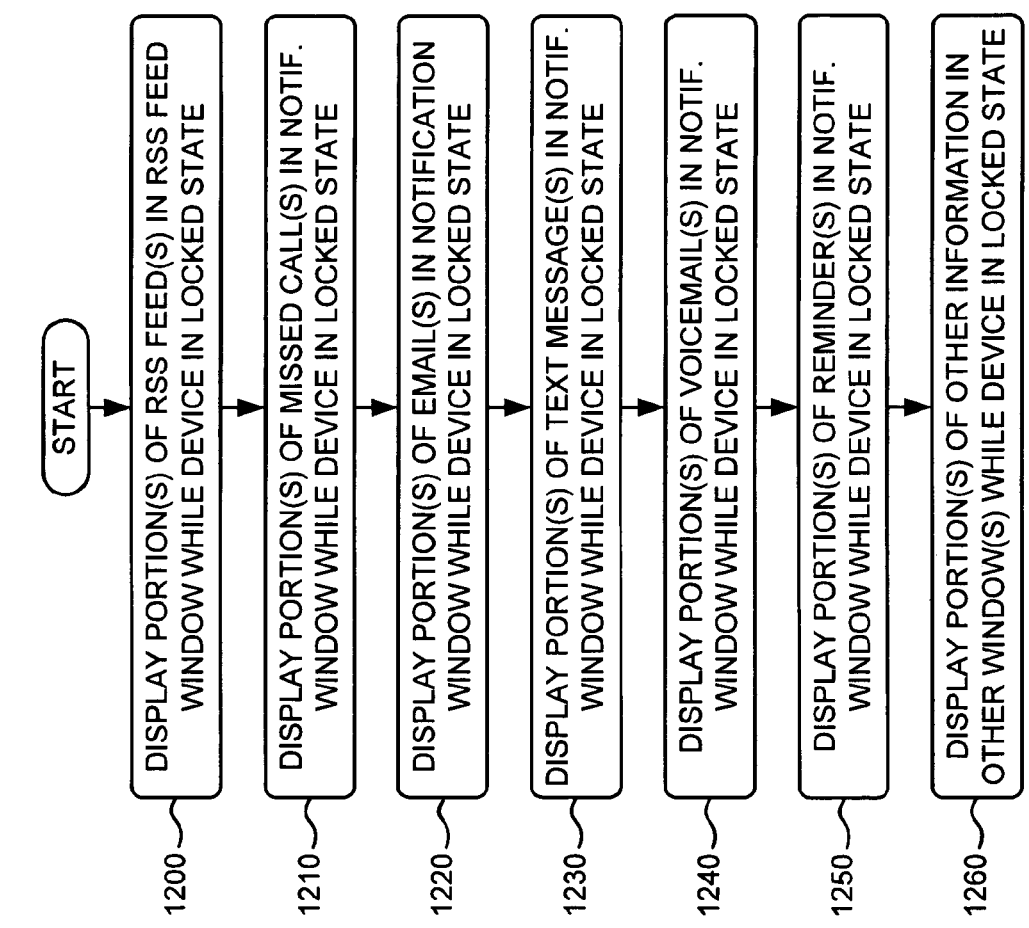

Process block 940 may include the process blocks illustrated in FIG. 12. As shown in FIG. 12, process block 940 may include, while the device is in the locked state, displaying one or more portions of the RSS feed(s) in the RSS feed window (block 1200), displaying one or more portions of the missed call(s) in the notification window (1210), displaying one or more portions of the email(s) in the notification window (1220), displaying one or more portions of the text message(s) in the notification window (block 1230), displaying one or more portions of the voicemail(s) in the notification window (block 1240), displaying one or more portions of the reminder(s) in the notification window (block 1250), and/or displaying one or more portions of the other information in the other window(s) (block 1260). For example, in implementations described above in connection with FIG. 5A, device 100 may display (e.g., via display 120 and while still in a locked state) one or more of stock RSS window 505, time/date window 510, weather window 515, and/or notification window 520, as well as any associated current information 400. For example, device 100 may display portions of RSS feeds 410 in stock RSS window 505, may display portions of calls 420, emails 430, text messages 440, and voicemails 450 in notification window 520, may display portions of weather information 460 in weather window 515, and may display portions of time/date information 470 time/date window 510.

Figure 13:
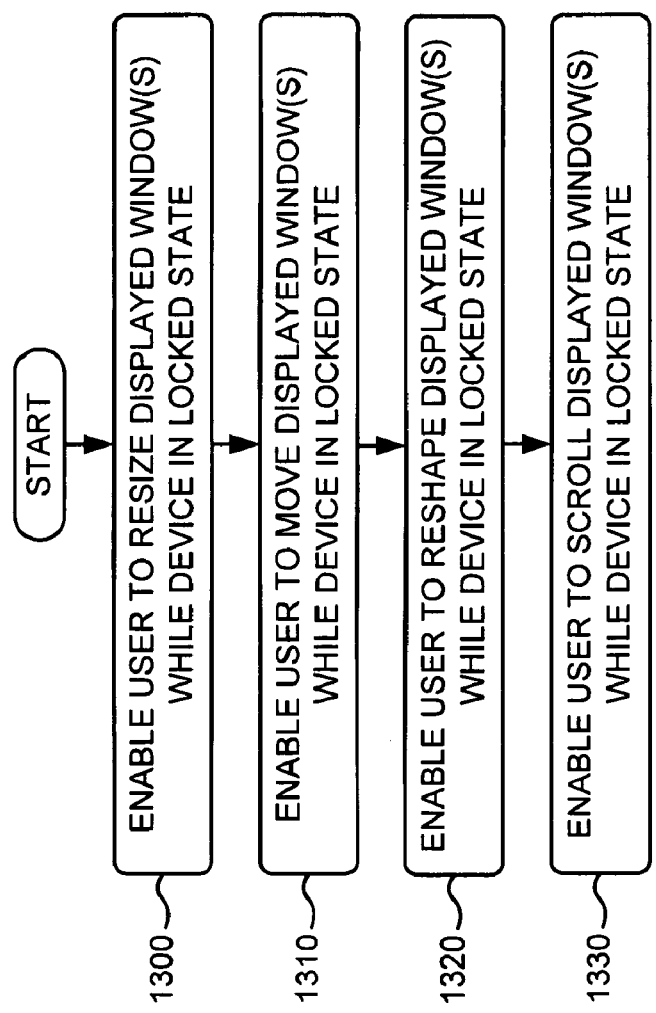

Process block 950 may include the process blocks illustrated in FIG. 13. As shown in FIG. 13, process block 950 may include, while the device is in the locked state, enabling the user to resize the displayed window(s) (block 1300), enabling the user to move the displayed window(s) (block 1310), enabling the user to reshape the displayed window(s) (block 1320), and/or enabling the user to scroll the displayed window(s) (block 1330). For example, in implementations described above in connection with FIG. 5B, device 100 may enable a user to manipulate one or more of stock RSS window 505, time/date window 510, weather window 515, and/or notification window 520, as well as information (e.g., entries) provided in windows 505-520 when device 100 is still in a locked state. In one exemplary implementation, device 100 may enable a user (e.g., via input object 330) to resize, reshape, move, zoom, expand, scroll, etc. one or more of stock RSS window 505, time/date window 510, weather window 515, and/or notification window 520 when device 100 is in a locked state. In other implementations, device 100 may enable a user (e.g., via input object 330) to resize, reshape, move, zoom, expand, scroll, etc. one or more entries associated with windows 505-520 when device 100 is in a locked state.

Process block 980 may include the process blocks illustrated in FIG. 14. As shown in FIG. 14, process block 980 may include enabling the user to view an entire set of information about a missed call(s) provided in the notification window (block 1400), enabling the user to view entire email(s) provided in the notification window (block 1410), enabling the user to view entire text message(s) provided in the notification window (block 1420), enabling the user to view (and/or listen to) entire description information about voicemail(s) provided in the notification window (block 1430), and/or enabling the user to view other information provided in the other window(s) (block 1440). For example, in implementations described above in connection with FIGS. 6A and 6B, once device 100 is in an unlocked state, user manipulation of display 120 may activate functions associated with the information provided by display 120. In one example, if the user selects (e.g., via input object 330) entry 630 (e.g., missed call 530 received from Kevin), device 100 may activate the functions associated with entry 630 (e.g., device 100 may display all information associated with entry 630). Activation of the functions associated with entry 630 may cause device 100 to display (e.g., via display 120) missed call information 640, a first selection mechanism 650, and a second selection mechanism 650. Missed call information 640 may include information associated with missed call 530 received from Kevin.

Systems and/or methods described herein may enable a user to interact with a touch screen of a mobile communication device and to view current information when the mobile communication device is in a locked state. In one implementation, for example, the systems and/or methods may receive current information with a device, while the device is in a sleep (or locked) state, may associate one or more portions of the current information with one or more corresponding windows, and may receive an input to wake up the device in a locked state. The systems and/or methods may display, via a device display, the window(s) with the associated portion(s) of the current information while the device is in the locked state, may enable a user to manipulate, via the device display, the displayed window(s) while the device is in the locked state, and may receive an input to unlock the device. The systems and/or methods may continue to display the window(s) while the device is in the unlocked state, and may enable the user to activate one or more functions associated with the associated portion(s) of the current information.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 9-14, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile communication device-implemented method, the method comprising:
   receiving information with the mobile communication device while the mobile communication device is in a locked state;
   associating one or more portions of the information with one or more corresponding first windows;
   displaying, via a display associated with the mobile communication device, the one or more corresponding first windows and the one or more associated portions of the information while the mobile communication device is in the locked state;
   displaying, via the display, a second window that includes information regarding the locked state, where the second window is different than the corresponding first windows; and
   enabling a user associated with the mobile communication device to manipulate the one or more displayed corresponding first windows while the mobile communication device is in the locked state, the manipulating including at least one of:
   resizing, reshaping, zooming, or expanding the one or more displayed corresponding first windows.

2. The mobile communication device-implemented method of claim 1, further comprising:
   enabling the user to manipulate the one or more displayed and associated portions of the information while the mobile communication device is in the locked state.

3. The mobile communication device-implemented method of claim 1, where enabling the user to manipulate the one or more displayed and associated portions of the information comprises at least one of:
   enabling the user to resize the one or more displayed and associated portions of the information while the mobile communication device is in the locked state,
   enabling the user to move the one or more displayed and associated portions of the information while the mobile communication device is in the locked state,
   enabling the user to reshape the one or more displayed and associated portions of the information while the mobile communication device is in the locked state, or
   enabling the user to scroll the one or more displayed and associated portions of the information while the mobile communication device is in the locked state.

4. The mobile communication device-implemented method of claim 1, further comprising:
   receiving an input from the user to wake up the mobile communication device when the mobile communication device is in a sleep state; and
   waking up the mobile communication device in the locked state based on the received input.

5. The mobile communication device-implemented method of claim 1, further comprising:
    receiving an input from the user to unlock the mobile communication device; and
    setting the mobile communication device to an unlocked state based on the received input.

6. The mobile communication device-implemented method of claim 5, further comprising:
    continuing to display, via the display, the one or more corresponding first windows and the one or more associated portions of the information while the mobile communication device is in the unlocked state; and
    enabling the user to activate one or more functions associated with the one or more associated portions of the information while the mobile communication device is in the unlocked state.

7. The mobile communication device-implemented method of claim 6, where the one or more corresponding first windows include a notification window and enabling the user to activate one or more functions comprises at least one of:
    enabling the user to view an entire set of information about a missed call provided in the notification window,
    enabling the user to view an entire email provided in the notification window,
    enabling the user to view an entire text message provided in the notification window,
    enabling the user to view an entire set of information about a voicemail provided in the notification window, or
    enabling the user to view an entire reminder provided in the notification window.

8. The mobile communication device-implemented method of claim 1, where receiving information comprises at least one of:
    receiving one or more Really Simple Syndication (RSS) feeds while the mobile communication device is in the locked state,
    receiving one or more calls while the mobile communication device is in the locked state,
    receiving one or more emails while the mobile communication device is in the locked state,
    receiving one or more text messages while the mobile communication device is in the locked state,
    receiving one or more voicemails while the mobile communication device is in the locked state,
    receiving reminder information while the mobile communication device is in the locked state,
    receiving time and date information while the mobile communication device is in the locked state, or
    receiving weather information while the mobile communication device is in the locked state.

9. The mobile communication device-implemented method of claim 8, where associating one or more portions of the information comprises at least one of:
    associating the one or more RSS feeds with an RSS feed window,
    associating the one or more calls with a notification window,
    associating the one or more emails with the notification window,
    associating one or more text messages with the notification window,
    associating the one or more voicemails with the notification window,
    associating the reminder information with the notification window,
    associating the time and date information with a time and date window, or
    associating the weather information with a weather window.

10. The mobile communication device-implemented method of claim 9, where displaying, via a display associated with the mobile communication device, the one or more corresponding first windows comprises at least one of:
    displaying one or more portions of the one or more RSS feeds in the RSS feed window while the mobile communication device is in the locked state,
    displaying one or more portions of the one or more calls in the notification window while the mobile communication device is in the locked state,
    displaying one or more portions of the one or more emails in the notification window while the mobile communication device is in the locked state,
    displaying one or more portions of one or more text messages in the notification window while the mobile communication device is in the locked state,
    displaying one or more portions of the one or more voicemails in the notification window while the mobile communication device is in the locked state,
    displaying one or more portions of the reminder information in the notification window while the mobile communication device is in the locked state,
    displaying one or more portions of the time and date information in the time and date window while the mobile communication device is in the locked state, or
    displaying one or more portions of the weather information in the weather window while the mobile communication device is in the locked state.

11. The mobile communication device-implemented method of claim 1, where enabling the user associated with the mobile communication device to manipulate the one or more displayed corresponding first windows comprises at least one of:
    enabling the user to move the one or more displayed corresponding first windows while the mobile communication device is in the locked state,
    or
    enabling the user to scroll the one or more displayed corresponding first windows while the mobile communication device is in the locked state.

12. A mobile communication device comprising:
    a touch screen;
    a memory to store a plurality of instructions; and
    a processor to execute instructions in the memory to:
        receive information while the mobile communication device is in a locked state,
        associate one or more portions of the information with one or more corresponding first windows,
        display, via the touch screen, the one or more corresponding first windows and the one or more associated portions of the information while the mobile communication device is in the locked state,
        display, via the touch screen, a second window that includes information regarding the locked state, the second window being different than the corresponding first windows; and
        enable a user associated with the mobile communication device to manipulate the one or more displayed corresponding first windows while the mobile communication device is in the locked state, when enabling the user to manipulate the one or more displayed corresponding first windows, the processor being further to:

enable the user to resize, reshape, zoom, or expand the one or more displayed corresponding first windows.

13. The mobile communication device of claim 12, where the mobile communication device comprises one or more of:
a radiotelephone,
a personal communications system (PCS) terminal,
a personal digital assistant (PDA),
a portable gaming system, or
a global positioning system (GPS) device.

14. The mobile communication device of claim 12, where, when enabling the user to manipulate the one or more displayed and associated portions of the information, the processor further executes instructions in the memory to at least one of:
enable the user to resize the one or more displayed and associated portions of the information while the mobile communication device is in the locked state,
enable the user to move the one or more displayed and associated portions of the information while the mobile communication device is in the locked state,
enable the user to reshape the one or more displayed and associated portions of the information while the mobile communication device is in the locked state, or
enable the user to scroll the one or more displayed and associated portions of the information while the mobile communication device is in the locked state.

15. The mobile communication device of claim 12, where the processor further executes instructions in the memory to:
receive an input from the user to wake up the mobile communication device when the mobile communication device is in a sleep state; and
wake up the mobile communication device in the locked state based on the received input.

16. The mobile communication device of claim 12, where the processor further executes instructions in the memory to:
receive an input from the user to unlock the mobile communication device; and
set the mobile communication device to an unlocked state based on the received input.

17. The mobile communication device of claim 16, where the processor further executes instructions in the memory to:
continue to display, via the touch screen, the one or more corresponding first windows and the one or more associated portions of the information while the mobile communication device is in the unlocked state, and
enable the user to activate one or more functions associated with the one or more associated portions of the information while the mobile communication device is in the unlocked state.

18. The mobile communication device of claim 17, where the one or more corresponding first windows include a notification window and, when enabling the user to activate one or more functions, the processor further executes instructions in the memory to at least one of:
enable the user to view an entire set of information about a missed call provided in the notification window,
enable the user to view an entire email provided in the notification window,
enable the user to view an entire text message provided in the notification window,
enable the user to view an entire set of information about a voicemail provided in the notification window, or
enable the user to view an entire reminder provided in the notification window.

19. The mobile communication device of claim 12, where, when receiving information, the processor further executes instructions in the memory to at least one of:
receive one or more Really Simple Syndication (RSS) feeds while the mobile communication device is in the locked state,
receive one or more calls while the mobile communication device is in the locked state,
receive one or more emails while the mobile communication device is in the locked state,
receive one or more text messages while the mobile communication device is in the locked state,
receive one or more voicemails while the mobile communication device is in the locked state,
receive reminder information while the mobile communication device is in the locked state,
receive time and date information while the mobile communication device is in the locked state, or
receive weather information while the mobile communication device is in the locked state.

20. The mobile communication device of claim 19, where, when associating one or more portions of the information, the processor further executes instructions in the memory to at least one of:
associate the one or more RSS feeds with an RSS feed window,
associate the one or more calls with a notification window,
associate the one or more emails with the notification window,
associate one or more text messages with the notification window,
associate the one or more voicemails with the notification window,
associate the reminder information with the notification window,
associate the time and date information with a time and date window, or
associate the weather information with a weather window.

21. The mobile communication device of claim 20, where, when displaying, via the touch screen, the one or more corresponding first windows, the processor further executes instructions in the memory to at least one of:
display one or more portions of the one or more RSS feeds in the RSS feed window while the mobile communication device is in the locked state,
display one or more portions of the one or more calls in the notification window while the mobile communication device is in the locked state,
display one or more portions of the one or more emails in the notification window while the mobile communication device is in the locked state,
display one or more portions of one or more text messages in the notification window while the mobile communication device is in the locked state,
display one or more portions of the one or more voicemails in the notification window while the mobile communication device is in the locked state,
display one or more portions of the reminder information in the notification window while the mobile communication device is in the locked state,
display one or more portions of the time and date information in the time and date window while the mobile communication device is in the locked state, or
display one or more portions of the weather information in the weather window while the mobile communication device is in the locked state.

22. The mobile communication device of claim 12, where, when enabling the user associated with the mobile communication device to manipulate the one or more displayed corresponding first windows, the processor further executes instructions in the memory to at least one of:
  enable the user to move the one or more displayed corresponding first windows while the mobile communication device is in the locked state,
  or
  enable the user to scroll the one or more displayed corresponding first windows while the mobile communication device is in the locked state.

23. The mobile communication device of claim 12, where the processor further executes instructions in the memory to:
  enable the user to configure the one or more portions of the information associated with the one or more displayed corresponding first windows.

24. A device comprising:
  means for receiving information with the device while the device is in a locked state;
  means for associating one or more portions of the information with one or more corresponding first windows;
  means for displaying, via a display associated with the device, the one or more corresponding first windows and the one or more associated portions of the information while the device is in the locked state;
  means for displaying, via the display, a second window that includes information regarding the locked state, where the second window is different than the corresponding first windows;
  means for enabling a user associated with the device to manipulate the one or more displayed corresponding first windows while the device is in the locked state;
  means for enabling the user to manipulate the one or more displayed and associated portions of the information while the device is in the locked state, the means for enabling including at least one of:
    means for resizing, means for reshaping, means for zooming, or means for expanding the one or more displayed corresponding first windows;
  means for continuing to display, via the display, the one or more corresponding first windows and the one or more associated portions of the information while the device is in an unlocked state; and
  means for enabling the user to activate one or more functions associated with the one or more associated portions of the information while the device is in the unlocked state.

25. The device of claim 24, where the means for enabling includes at least one of:
  means for enabling the user to move the one or more displayed corresponding first windows while the device is in the locked state; or
  means for enabling the user to scroll the one or more displayed corresponding first windows while the device is in the locked state.

* * * * *